United States Patent
Kumagai

(10) Patent No.: US 8,561,057 B2
(45) Date of Patent: Oct. 15, 2013

(54) INFORMATION PROCESSING APPARATUS, PROCESSING METHOD, AND COMPUTER-READABLE RECORDING MEDIUM HAVING PROCESSING PROGRAM RECORDED THEREON

(75) Inventor: Yoshitomo Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 435 days.

(21) Appl. No.: 13/023,643

(22) Filed: Feb. 9, 2011

(65) Prior Publication Data

US 2011/0219369 A1 Sep. 8, 2011

(30) Foreign Application Priority Data

Mar. 8, 2010 (JP) ................................. 2010-050460

(51) Int. Cl.
*G06F 9/445* (2006.01)
(52) U.S. Cl.
USPC ........................................................ 717/174
(58) Field of Classification Search
USPC ........................................................ 717/174
See application file for complete search history.

(56) References Cited

U.S. PATENT DOCUMENTS

| | | | |
|---|---|---|---|
| 2005/0149883 A1* | 7/2005 | Roesner et al. | 716/1 |
| 2007/0240049 A1* | 10/2007 | Rogerson et al. | 715/700 |
| 2010/0299647 A1* | 11/2010 | Hakewill et al. | 716/111 |
| 2012/0304120 A1* | 11/2012 | Gelling | 715/810 |

FOREIGN PATENT DOCUMENTS

JP 2000-347780 12/2000

* cited by examiner

*Primary Examiner* — Philip Wang
(74) *Attorney, Agent, or Firm* — Staas & Halsey LLP

(57) ABSTRACT

By including a control definition information storage unit that obtains, from control definition information having control information related to an application program defined, a functional element identification name that can be arbitrarily set to a functional element; a functional element definition information reading section that obtains, by referencing to functional element definition information configured related to a functional element ID unique to the functional element identification name, the functional element ID corresponding to the functional element identification name; and a setup unit that sets up the application program in the information processing apparatus, using the obtained functional element ID the need to create multiple resource files and code files for the respective purposes or the like can be eliminated, thereby reducing the management cost therefor.

19 Claims, 46 Drawing Sheets

<BPDEF> : <SPEC VER. NO.>, <CREATION TIME>, <"CREATOR">, <"COMMENT">
DEFINITION OF USE COMMAND LIST FOR EACH LANGUAGE, DEFINITION OF REPLACEMENT OF CHARACTERS, ETC. ...
<BPDEFEND> a1

BPDEF : 1, 20060816, "Y.Kumagai", "INFRA CAD (V1)-SAMPLE"
DEFINITION OF REPLACEMENT OF JAPANESE CHARACTERS
DEFINITION OF REPLACEMENT OF ENGLISH CHARACTERS
BPDEFEND

```
<MEBP_LANG> <LANGUAGE>
 DEFINITION OF USE COMMAND LIST FOR SPECIFIED LANGUAGE,
 DEFINITION OF REPLACEMENT OF CHARACTERS, ETC. ...
<MEBP_LANGEND>
```

```
MEBP_LANG
    DEFINITION OF USE COMMAND LIST FOR JAPANESE,
    DEFINITION OF REPLACEMENT OF CHARACTERS, ETC. ...
MEBP_LANGEND

# DEFINITION OF ENGLISH VERSION
MEBP_LANG ENGLISH
    DEFINITION OF USE COMMAND LIST FOR ENGLISH,
    DEFINITION OF REPLACEMENT OF CHARACTERS, ETC. ...
MEBP_LANGEND
```

```
<USECOMMAND>
    <PROJECT> <PROJECT FOLDER NAME>
        <COMMAND NAME> # <COMMENT FOR COMMAND NAME>
    <PROJECTEND>
<USECOMMANDEND>
```

FIG. 10

```
USECOMMAND
  PROJECT MEBP
    # ――――――――――――――――――――――――――――――――――――――
    # FILE
    # ――――――――――――――――――――――――――――――――――――――
    ID_BP_FILE_OPEN          # "OPEN(&O)...¥tCtrl+O"
    ID_BP_FILE_CLOSE         # "CLOSE(&C)"
  # ID_BP_FILE_SAVE          # "SAVE(&S)¥tCtrl+S"
    # ――――――――――――――――――――――――――――――――――――――
    # EDIT -> COPY BETWEEN ADFS
    # ――――――――――――――――――――――――――――――――――――――
    ID_EDIT_PART_COPY        # "PARTIAL CIRCUIT COPY(&S)"
    ID_EDIT_PART_PUT         # "PARTIAL CIRCUIT PASTE(&T)"
  PROJECTEND
  PROJECT EDITATTR
    # ――――――――――――――――――――――――――――――――――――――
    # FILE
    # ――――――――――――――――――――――――――――――――――――――
    ID_SAVE_TO_CSV_OVERWRITE # "OVERWRITE IN CSV FORMAT(&S)"
    ID_SAVE_TO_CSV           # "SAVE AS IN CSV FORMAT(&W)"
    # ――――――――――――――――――――――――――――――――――――――
    # EDIT
    # ――――――――――――――――――――――――――――――――――――――
    ID_LIST_DLG_MENUITEM_START_EDITATTR  # "EDIT SELECTED ELEMENT(&E)"
    ID_LIST_DLG_MENUITEM_DELETE_LAYOUT   # "DELETE IMPLEMENTATION INFORMATION(&D)"
  PROJECTEND
USECOMMANDEND
```

↙ a3

```
<UNUSECOMMAND>
  <PROJECT> <PROJECT FOLDER NAME>
    <COMMAND NAME> # <COMMENT FOR COMMAND NAME>
  <PROJECTEND>
<UNUSECOMMANDEND>
```

```
UNUSECOMMAND
  PROJECT MEBP
    #----------------------------------
    # FILE
    #----------------------------------
    ID_BP_FILE_SAVE                  # "SAVE (&S) ¥tCtrl+S"
  PROJECTEND
  PROJECT EDITATTR
    #----------------------------------
    # EDIT
    #----------------------------------
    ID_LIST_DLG_MENUITEM_START_EDITATTR  # "EDIT SELECTED ELEMENT (&E)"
    ID_LIST_DLG_MENUITEM_DELETE_LAYOUT   # "DELETE IMPLEMENTATION INFORMATION (&D)"
  PROJECTEND
UNUSECOMMANDEND
``` a4

```
<COMMAND_STRINGCHANGE>
  <PROJECT FOLDER NAME>:<COMMAND NAME> < "REPLACING CHARACTER" > < "REPLACED CHARACTER" >
<COMMAND_STRINGCHANGEEND>
``` a5

FIG. 15

```
COMMAND_STRIINGCHANGE
    MEBP:*
    *: ID_TOOL_ADD_MISC_PART    "AAA"    "BBB"
                                "MECHANISM PART"  "SYSTEM ATTACHMENT"
COMMAND_STRINGCHANGEEND
```

```
DIALOG_STRINGCHANGE

DIALOG *:*
   "PART PIN"    "IF"
   "PIN NAME"    "IF NAME"
DIALOGEND

DIALOG MEBP:" MECHANISM PART ENTRY"
   "MECHANISM PART ENTRY"           "SYSTEM ATTACHMENT ENTRY"
   "SPECIAL PREPARE INSTRUCTION"    "BORROW/CARRY-IN"
   "ENTERED PART INFORMATION"       "ENTERED PRODUCT INFORMATION"
   "PART NAME"                      "PRODUCT NAME"
   "ENTERED PART INFORMATION"       "ENTERED PRODUCT INFORMATION"
DIALOGEND

DIALOG_STRINGCHANGEEND
``` a6

```
<RESOURCE_STRINGCHANGE>
<" RESOURCE NAME" > <" CHARACTER TO BE REPLACED" >
<RESOURCE_STRINGCHANGEEND>
``` a7

```
RESOURCE_STRINGCHANGE
 "IDS_LABEL_ITEM"    "BORROW/CARRY-IN"
 "IDS_VALUE_ITEM"    "BORROW#CARRY-IN"
RESOURCE_STRINGCHANGEEND
``` a7

```
MESSAGE_STRINGCHANGE
  "PART"            "PRODUCT"
  "SPECIAL PREPARE FLAG"  "BORROW/CARRY-IN"
  "UNSET"           "UNREGISTERED"
MESSAGE_STRINGCHANGEEND
``` a8

FIG. 22

```
<RELEASE_UNUSECOMMAND>
  <PROJECT> <PROJECT FOLDER NAME>:<COMMAND NAME TO BE EXECUTED>
  <COMMAND NAME TO RELEASE USE PROHIBITION> # <COMMENT FOR COMMAND NAME>
  <PROJECTEND>
<RELEASE_UNUSECOMMANDEND>
``` a9

```
RELEASE_UNUSECOMMAND
    PROJECT MEBP ID_EDIT_PRODUCT    # EDIT COMMAND NAME WITHIN PRODUCT
    ID_TOOL_UNGROUP                 # CANCEL GROUP
    ID_SHOW_PLACE_DLG               # ENTER PART
    PROJECTEND
RELEASE_UNUSECOMMANDEND
```

FIG. 24

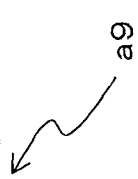

```
[FUNCTION INTERFACE]
void bpdef::startReleaseCommand(const std::string& project, UINT& id )
[ARGUMENTS]
 .project : PROJECT NAME IN WHICH COMMAND NAME TO BE EXECUTED IS DEFINED
 .id      : COMMAND NAME TO BE EXECUTED
[FUNCTION SUMMARY]
FIND A DEFINITION HAVING PROJECT AND ID SPECIFIED IN THE ARGUMENTS FROM
RELEASE_UNUSECOMMAND DEFINITION IN BPDEF, AND TEMPORALLY SET THE DEFINED COMMAND NAME
TO A USABLE COMMAND.
SINCE INFORMATION IN THE ARGUMENTS OF THIS FUNCTION IS SAVED IN A STACK BY A BPDEF
SIDE, DURING EXECUTING A COMMAND, IT IS POSSIBLE TO INSTRUCT TO RELEASE A PROHIBITED
COMMAND FOR ANOTHER COMMAND.
``` a9

FIG. 25

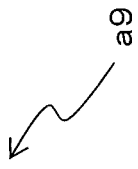

[FUNCTION INTERFACE 2]
void bpdef::endReleaseCommand(const std::string& project, UINT& id)
[ARGUMENTS]
· project : PROJECT NAME IN WHICH COMMAND NAME TO BE EXECUTED IS DEFINED
· id : COMMAND NAME TO BE EXECUTED
[FUNCTION SUMMARY]
FIND A DEFINITION HAVING PROJECT AND ID SPECIFIED IN THE ARGUMENTS FROM RELEASE_UNUSECOMMAND DEFINITION IN BPDEF, AND SET THE DEFINED COMMAND NAME BACK TO A USE PROHIBITED COMMAND.

a9

```
<LICENSE_COMMAND> <"COMMENT">
<LICENSE> <"LICENSE NAME" >
    DEFINITION OF LIST OF COMMAND THAT ARE USABLE OR UNUSABLE FOR EACH LICENSE
<LICENSEEND>
<LICENSE_COMMANDEND>
``` a11

```
LICENSE_COMMAND
LICENSE  "BASE"
    USECOMMAND
        ID_BP_FILE_NEW       # "NEW(&N)...¥tCtrl+N"
    USECOMMAND_END
LICENSEEND
LICENSE_COMMANDEND
``` a11

```
<USER_SETTING>
  <KEY NAME>=<" VALUE TO BE SET" >   ...FOR STRING
  <KEY NAME>=<VALUE TO BE SET>       ...FOR NUMERICAL VALUE
<USER_SETTINGEND>
``` a10

```
TOOLBAR
    ROW_GROUP                       # FIRST ROW
        ID_VIEW_TOOLBAR             # FILE
        ID_VIEW_TOOLBAR_EDIT        # EDIT
    ROW_GROUPEND
    ROW_GROUP                       # SECOND ROW
        ID_VIEW_TOOLBAR_FIND        # FIND
        ID_VIEW_TOOLBAR_LIST        # DISPLAY INFORMATION
    ROW_GROUPEND
TOOLBAREND
``` a10

```
WINDOW
    ID_VIEW_WINDOW_FULLVIEW           # FULL VIEW
    ID_BP_TREEVIEW_DISPLAY            # TREE VIEW
    ID_VIEW_WINDOW_MESSAGE            # MESSAGE
    ID_LAYERCONTROL_DISPLAY           # LAYER CONTROL
  # ID_ELEMENTCONTROL_DISPLAY         # ELEMENT CONTROL
    ID_PLACE_DISPLAY                  # PLACE DIALOG
WINDOWEND
``` a10

```
<PROJECT> <PROJECT FOLDER NAME>
<COMMAND NAME> <COMMAND ID> <" JAPANESE COMMAND STRING" > <" ENGLISH COMMAND STRING" >
<PROJECTEND>
```

```
PROJECT MEBP
    ID_VIEW_ZOOM_ALL         32830    "全体表示(&A)"              "Zoom full(&A)"
    ID_VIEW_ZOOM_IN          32833    "拡大表示(&I)"              "Zoom up(&I)"
    ID_VIEW_ZOOM_OUT         32835    "縮小表示(&O)"              "Zoom down(&O)"
    ID_OVERWRITE_CONSTCSV    33391    "上書き保存"                 ""
PROJECTEND PROJECT EDITATTR
    ID_SELECT_ITEM           32771    "表示項目選択(&S)"           "Display selected item(&S)"
    ID_READ_FROM_CSV         33018    "CSV形式から読み込み(&L)"    "Read from CSV format(&L)"
    ID_SAVE_TO_CSV_OVERWRITE 33028    "CSV形式で上書き保存(&S)"    "Overwrite in CSV format(&S)"
    ID_SELECT_CHILDPART      57373    "子部品一覧リストを表示する(&L)" "Display child part list(&L)"
PROJECTEND
```

| COMMAND NAME | COMMAND DESCRIPTION |
|---|---|
| ID_FILE_CLOSE | CLOSE |
| ID_FILE_PRINT | PRINT |
| ID_FILE_PRINT_PREVIEW | PRINT PREVIEW |
| ID_FILE_PRINT_SETUP | PRINTER SETUP |
| ID_APPENV | ENVIRONMENT SETUP |
| ID_EDIT_UNDO | UNDO |
| ID_EDIT_REDO | REDO |
| ID_EDIT_SELECT_ALL | SELECT ALL |
| ID_EDIT_COPY | COPY |
| ID_WINDOW_NEW | OPEN NEW WINDOW |
| ID_WINDOW_CASCADE | CASCADE |
| ID_WINDOW_TILE_VERT | TILE VERTICALLY |
| ID_WINDOW_TILE_HORZ | TILE HORIZONTALLY |
| ID_WINDOW_ARRANGE | ARRANGE ICONS |
| ID_HELP_INDEX | HELP |

```
PROJECT MFCAFXRES
    ID_FILE_CLOSE            57602   ''''
    ID_FILE_PRINT            57607   ''''
    ID_FILE_PRINT_DIRECT     57608   ''''
    ID_FILE_PRINT_PREVIEW    57609   ''''
PROJECTEND
```

```
#  VIEW (&V)
#  ID_VIEW_ZOOM_REDRAW      #  "REDRAW (&D)\tF5"
#  ID_VIEW_RESET            #  "RESET (&R)"
#  ID_VIEW_MAGNIFIER        #  "MAGNIFIER (&M)"
#  VIEW (&V) → ZOOM (&Z)
#  ID_VIEW_ZOOM_ALL         #  "ZOOM ALL (&A)"
#  ID_VIEW_ZOOM_IN          #  "ZOOM IN (&I)"
#  ID_VIEW_ZOOM_OUT         #  "ZOOM OUT (&O)"
#  ID_VIEW_ZOOM_PAN         #  "ZOOM PAN (&P)"
```

```
MENUITEM  "REDRAW (&D) ¥tF5",           ID_VIEW_ZOOM_REDRAW
POPUP  "ZOOM (&Z)"
BEGIN
    MENUITEM  "ZOOM ALL (&A)",          ID_VIEW_ZOOM_ALL
    MENUITEM  "ZOOM IN (&I)",           ID_VIEW_ZOOM_IN
    MENUITEM  "ZOOM OUT (&O)",          ID_VIEW_ZOOM_OUT
    MENUITEM  "ZOOM PAN (&P)",          ID_VIEW_ZOOM_PAN
END
MENUITEM  "RESET (&R)",                 ID_VIEW_RESET
```

FIG. 45

```
#define  ID_VIEW_ZOOM_ALL      30043
#define  ID_VIEW_ZOOM_IN       30045
#define  ID_VIEW_ZOOM_OUT      30047
#define  ID_VIEW_ZOOM_PAN      30049
#define  ID_VIEW_ZOOM_REDRAW   30054
#define  ID_VIEW_RESET         30163
```

INFORMATION PROCESSING APPARATUS, PROCESSING METHOD, AND COMPUTER-READABLE RECORDING MEDIUM HAVING PROCESSING PROGRAM RECORDED THEREON

CROSS-REFERENCE TO RELATED APPLICATION

This application is based upon and claims the benefit of priority of the prior Japanese Patent Application No. 2010-050460 filed on Mar. 8, 2010, the entire contents of which are incorporated herein by reference.

FIELD

The embodiments discussed herein are related to processing in an application program including multiple types of functional elements on an information processing apparatus.

BACKGROUND

A computer aided design (CAD) program (hereinafter, referred to as a "printed board CAD") used for the purpose of designing printed circuit boards has function to place on parts and wiring on the printed boards, for example. Sometimes, a user may desire to use the function of such a printed board CAD for purposes other than originally intended, such as designing layout of appliances and wiring in data centers or Internet data centers (IDCs), for example. This is expected to reduce the cost and time required to develop a CAD program used for designing layout of appliances in a data centers and the like (hereinafter, referred to as an "infra CAD").

In order to use a printed board CAD as an infra CAD, command names, label names, message texts that are displayed on the CAD, for example, must be changed. For example, texts, such as "signal name", "parts pin name", and "accessory", used in a printed board CAD can be changed to "connection name", "IF name", "attachment", and the like.

Furthermore, some of functions or particular commands in a function may become unnecessary, for some purpose of a program. For example, an FPGA (Field Programmable Gate Array) editor function or a constraint edit function, that are generally provided in a printed board CAD are not required for an infra CAD. In addition, in an infra CAD, RoHS (Restriction of Hazardous Substances) information, FPGA part information, and the like, within a information display function are not required.

Conventionally, in order to build an infra CAD from a printed board CAD, resource files for the project of the infra CAD are created by modifying resource files for certain projects in the printed board CAD program, thereby generating the infra CAD.

FIG. 44 is a diagram illustrating an example of a resource file; FIG. 45 is a diagram illustrating an example of a header file; and FIG. 46 is a diagram illustrating an example of a menu screen.

For example, the view control menu depicted in FIG. 46 has menu items, such as Redraw, Zoom all, Zoom in, Zoom out, Zoom pan, View reset. The view control menu depicted in FIG. 46 is defined in the resource file as illustrated in FIG. 44.

The resource file is a file used for handling various types of resources and is created by a programmer. In the Windows® operating system family, such a resource file is saved under a file name appended with the extension ".rc", for example.

In development of an interactive program, for example, a program may be constructed from multiple projects, including a core project that is the core of the program, and projects for respective functions, and resources of the application may be managed as a project. In addition, command names and label names on menus and dialog boxes used by each project is defined as resources for that project.

Generally, a programmer may give a self-explanatory resource name for each resource to identify that resource, and distinguishes between resources using their resource names. As used herein, "resources" are data (objects) used by a program, and information (attribute information) on texts, contents on windows, menus embedded into the program. Using such resources, font types, display colors, background colors, and the like, are set, for example.

A header file is a file defining IDs (resource IDs) uniquely assigned to respective resource. In the Windows® operating system family, it is saved under a file name, such as Resource.h, for example. After a program is compiled and a load module is generated, behaviors of the program on a computer are controlled using such resource IDs.

However, the work load for modifying a resource file is comparable for the work load required for developing a separate program, which may increase man-hours and cost required for creation, maintenance, and management of resource files. In order to develop multiple programs for a certain number of purposes, the same number of resource files are also required. Furthermore, when multiple resource files are kept, some of resource files may remain unchanged during modification of the resource files, which may deteriorate the quality of the programs.

Techniques are well known in which graphical interfaces or sounds of program are modified by displaying a specialized setup menu (see Japanese Laid-open Patent Publication No. 2000-347780). However, in addition to modification of how items are shown on a screen, a programmer may desire to modify the functions of a program after the program is installed, such as enabling or disabling some functions of the program. However, since a load module of a program is controlled using resource IDs as described above, a programmer cannot modify functions of programs with self-explanatory resource names that are arbitrary set by the programmer, which is troublesome.

SUMMARY

Disclosed herein is an-information processing apparatus being capable of executing an application program including multiple types of functional elements, the information processing apparatus including: a control definition information storage unit that stores control definition information having control information related to the application program defined using a functional element identification name that can be arbitrarily set to the functional element; a functional element definition information storage unit that stores functional element definition information related to a functional element ID unique to the functional element identification name; a control definition information reading unit that obtains the functional element identification name from the control definition information stored in control definition information storage unit; a functional element definition information reading unit that obtains the functional element ID corresponding to the functional element identification name obtained by the control definition information reading unit, by making reference to the functional element definition information stored in the functional element definition information storage unit; and a setup unit that sets up the application program in the information processing apparatus in accordance with control information related to the application program defined in the control definition information, using the functional element ID obtained by the functional element definition information reading unit.

Also disclosed is a method of processing an application program including multiple types of functional elements in an information processing apparatus, the method including: a control definition information obtaining that obtains, for the application program, using a functional element identification name that is arbitrary set to a functional element, the functional element identification name from control definition information for which control information related to the application program is defined; a functional element definition information obtaining that obtains, by referencing to functional element definition information configured related to a functional element ID unique to the functional element identification name, the functional element ID corresponding to the functional element identification name obtained at the control definition information obtaining; and a setup that sets up the application program in the information processing apparatus in accordance with control information related to the application program defined in the control definition information, using the functional element ID obtained at the functional element definition information obtaining.

Also disclosed is a computer-readable recording medium having a processing program stored thereon, the processing program making a computer to process an application program including multiple types of functional elements, the processing program makes the computer to execute: a control definition information obtaining that obtains, for the application program, using a functional element identification name that is arbitrary set to a functional element, the functional element identification name from control definition information for which control information related to the application program is defined; a functional element definition information obtaining that obtains, by referencing to functional element definition information configured related to a functional element ID unique to the functional element identification name, the functional element ID corresponding to the functional element identification name obtained at the control definition information obtaining; and a setup that sets up the application program in the information processing apparatus in accordance with control information related to the application program defined in the control definition information, using the functional element ID obtained at the functional element definition information obtaining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 10 is a diagram illustrating an example of the definition in a use command definition section as one example of an embodiment;

FIG. 15 is a diagram illustrating an example of the definition in a command character replacement definition section in a BP-DEF as one example of an embodiment;

FIG. 17 is a diagram illustrating an example of the definition in a screen character replacement definition section as one example of an embodiment;

FIG. 22 is a diagram exemplifying a format of a prohibited command release definition section as one example of an embodiment;

FIG. 24 is a diagram exemplifying a definition of an API function related to the operation of a prohibited command release definition section in an information processing apparatus as one example of an embodiment;

FIG. 25 is a diagram exemplifying a definition of an API function related to the operation of a prohibited command release definition section in an information processing apparatus as one example of an embodiment;

FIG. 35 is a diagram illustrating an example of the definition in a definition format for a CommandInfo.txt as one example of an embodiment;

FIG. 36 is a diagram exemplifying an MFC-standard command obtained upon generation of a CommandInfo.txt as one example of an embodiment;

FIG. 42 is a diagram illustrating an example of the definition in a BP-DEF as one example of an embodiment;

FIG. 44 is a diagram illustrating an example of a resource file;

FIG. 45 is a diagram illustrating an example of a header file; and

DESCRIPTION OF EMBODIMENT(S)

Hereinafter, embodiments of an information processing apparatus, a processing method, a processing program, and a computer-readable recording medium having the program stored thereon will be described with reference to the drawings.

Figure 1:
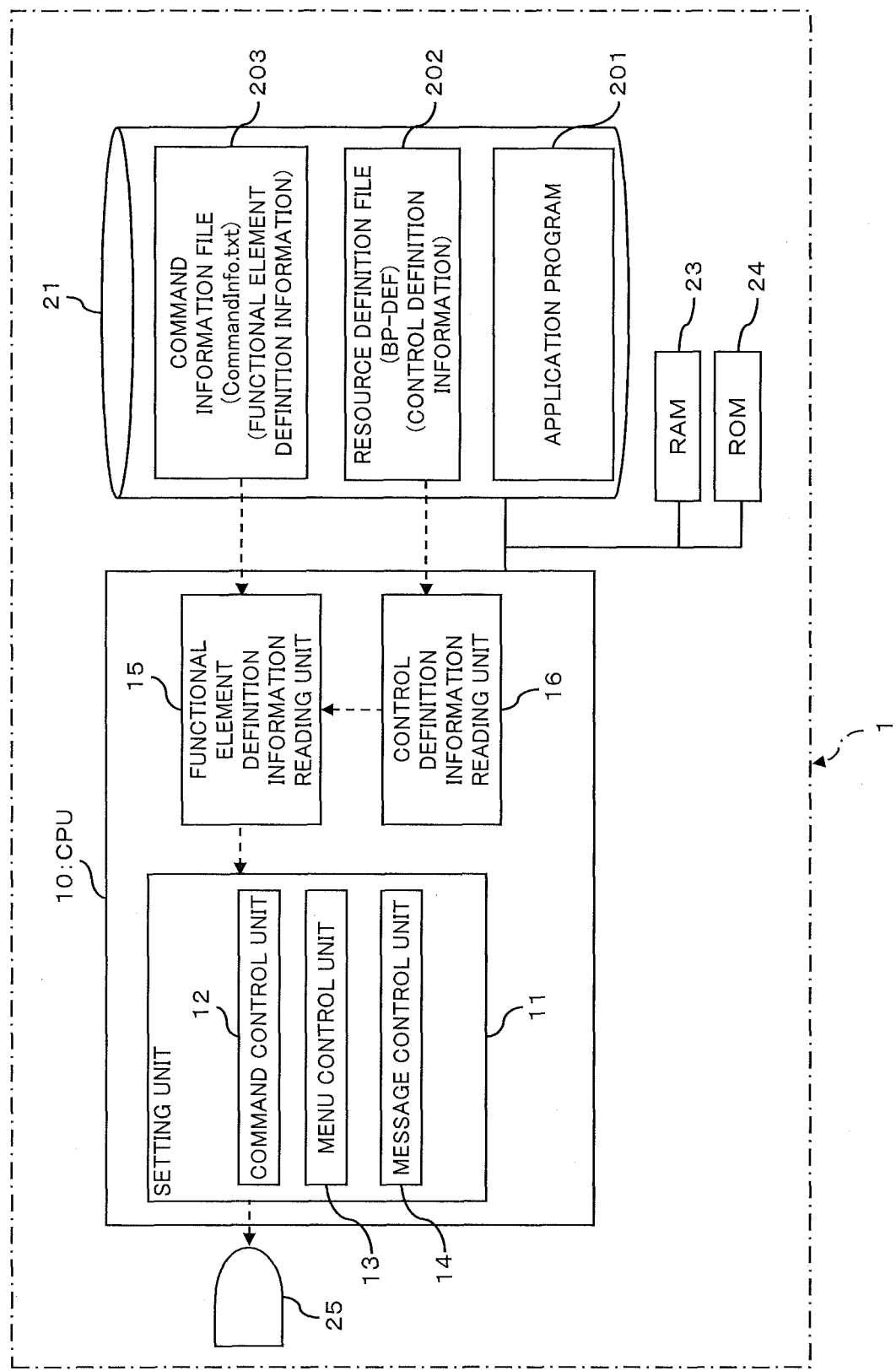
FIG. 1 is a diagram schematically illustrating an example of the structure of an information processing apparatus as one example of an embodiment.

FIG. 1 is a diagram schematically illustrating an example of the structure of an information processing apparatus as one example of an embodiment. This information processing apparatus (computer) 1 embodies various functions by executing an application program.

The information processing apparatus 1 includes, as depicted in FIG. 1, a central processing unit (CPU) 10, storage device 21, a random access memory (RAM) 23, a read only memory (ROM) 24, and a display device 25.

The ROM 24 is a storage device that stores various types of programs and data. The RAM 23 is a storage device in which data or the like is temporally stored when the CPU 10, which will be described later, executes computations or controls.

The display device 25 is adapted to display various types of information, and various types of display devices may be used, such as liquid crystal displays, electroluminescence (EL) displays, cathode ray tube (CRT) displays, for example. Various types of information, such as various menus and messages, of an operating system (OS) or an application program 201 is displayed (output) on the display device 25.

The storage device (control definition information storage unit, functional element definition information storage unit) 21 is a storage device that stores various types of programs and data, and may includes a hard disk drive (HDD) or a solid state drive (SSD), for example. In addition to the OS and a boot strap program (not illustrated), for example, the application program 201, a resource definition file 202, and a command information file 203 are stored in the storage device 21.

The application program 201 is a program for making the information processing apparatus 1 to implement functions, and is stored as load modules (executable files), for example. The application program 201 also has multiple resources (functional elements).

As used herein, the "resources" are data (objects) used by programs, such as the OS and the application program 201, and include various commands, contents of texts or windows, information (attribute information) on menus. The resources used in the application program 201 determine a font type, the color, the background color of letters displayed on the display device 25, for example. In other words, by modifying the resources, the graphical user interface (GUI) or functions of the application program 201 can be modified as appropriate.

Note that, in this embodiment, the "menus" are used in a broader sense, including various menus placed on the menu bar of the GUI of an interactive application program (menu bar menus), pull down menus pulled down from a menu bar menu, and pop up menus displayed in response to a pointer operation on the display screen, for example.

The "commands" are minimum elements of processing in an interactive application program. One command is assigned to each of the item of the menus listed above. In other words, a correction of commands is displayed as a menu.

A "dialog (dialog box)" is a window that is displayed for exchange of information required for implementing a command before and/or after execution of that command.

In the information processing apparatus 1, when the application program 201 is being started, functions or GUIs of the application program 201 after its startup can be modified by switching between at least a part of the resources of the application program 201. This can enable the application program 201 to be used for different purposes.

Hereinafter, this embodiment will be described in the context that the application program 201 is a CAD program. In this case, for example, when the application program 201 is being started, the application program 201 can be selectively switched between two types of CAD, i.e., a printed board CAD and an infra CAD, by modifying at least a part of resources of the application program 201. In addition, even after the application program 201 has been started, a function or a screen display of the printed board CAD or the infra CAD can be suitably modified by modifying at least a part of resources of the application program 201. As used herein, a printed board CAD program is a CAD program used for designing circuits of printed circuit boards, while an infra CAD program is a CAD program used for designing layouts of appliances in data centers, for example.

Figure 2:
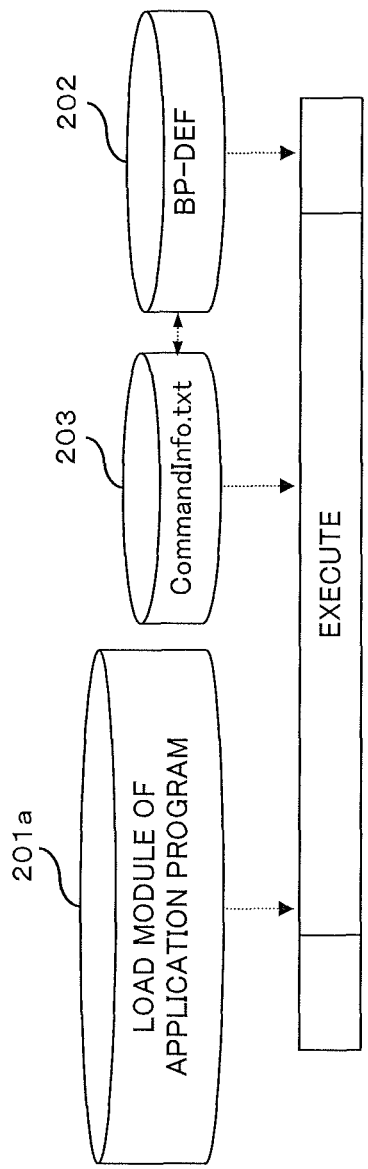
FIG. 2 is a diagram schematically illustrating an example of a software environment of an application program in an information processing apparatus as one example of an embodiment.

FIG. 2 is a diagram schematically illustrating an example of a software environment of the application program 201 in the information processing apparatus 1 as one example of an embodiment.

In the information processing apparatus 1, as depicted in FIG. 2, the application program 201 is executed by using a load module 201a of the application program 201, the resource definition file 202, and the command information file 203.

The load module 201a is an executable file that can be executed by the CPU 10, and is a file with an extension, such as "exe" or "dll", for example. The load module 201a is generated by build (compiling and linking) source code files (not illustrated) and resource files (not illustrated) for the application program 201. Note that the build is carried out by using a program, generally called a "build tool".

The source code files (code files) are files in which source codes (codes) are written. The source codes are a series of instructions for a computer written in the specification of a programming language, such as c or c++, for example. The resource files define GUIs, such as menus and dialog boxes, for example.

The resource definition file 202 is information defining control information for the application program 201, and is adapted to define control information for the application program 201 using resource names (functional element identification names) that are arbitrary specified for resources.

For example, in the case of Microsoft Foundation Class (MFC) for the Windows® operating system family, resources are managed using unique numerical values (resource IDs, functional element IDs) that are respectively provided for the resources. The resource IDs is generally numerical values (numbers) in a certain digit, but using such resource IDs is not convenient for a user, such as a programmer, who uses these resource ID when writing code files and resource files. Therefore, the programmer creates self-explanatory strings by combining characters and symbols, and assigns the created strings to respective resources as resource names. Upon programming, the programmer writes code files and resource files using these resource names, in place of resource IDs.

Hereinafter, it is assumed that a resource includes a command, and resource ID includes a command ID that is a numerical value that is unique to that command.

The resource definition file 202 is arbitrary specified by a user, such as a programmer, and control information for the application program 201 is defined using resource names.

The resource definition file 202 is preferably saved in a file name having a string "BP-DEF" (for example, BP-DEF.txt). Hereinafter, the resource definition file 202 is sometimes referred to as the "BP-DEF".

The resource definition file 202 includes definitions for controlling the functions (a)-(f) listed below, for example.

(a) Function to control to display or hide a particular command in a functional element or a function immediately after start of an execution (b) Function to change label names and the like upon displaying a menu or a dialog box (c) Function to change a message text upon outputting the message (d) Function to set a use prohibited command as executable only when a particular command is executed (e) Function to display or hide functions in accordance with a license (f) Function to set environmental setting in line with the environment of a user In this embodiment, the resource definition file 202 also includes a default BP-DEF, a BP-DEF for system customize, and a BP-DEF for user customize.

The default BP-DEF is a file defining information of default setting in various controls in the application program 201 (such as, definitions of use commands, instructions for replacing strings). In addition, the definitions in the default BP-DEF are made (set) by manual operation by a programmer.

In this embodiment, the default BP-DEF also includes default BP-DEF for printed board CAD (file name: BP-DEF_PT) and a default BP-DEF for infra CAD (file name: BP-DEF_INFRA).

Since these default BP-DEFs are defined by manual operation by a programmer as described above, some definition may be missed, such as commands to be used. Therefore, it is desirable to provide a separate program for checks any missing definition. For example, such a missing definition check program serially extracts resource names used in code files and resource files, and checks whether all resource names are defined (registered) in the default BP-DEFs.

The BP-DEF for system customize is used for customizing the default BP-DEF for the system, and is defined by a programmer. In this embodiment, a separate BP-DEFs for system customize are defined for each purpose of the application program 201.

For example, in the case wherein a printed board CAD has two purposes, i.e., design of communication devices and a design of information processing apparatuses, two types of BP-DEFs for system customize are prepared, namely, a BP-DEF for a customize A used for design of communication devices (file name: BP-DEF_A) and a BP-DEF for a customize B used for design of information processing apparatuses (file name: BP-DEF_B).

The BP-DEF for user customize is a file defining user-specific controls by a user of the application program 201 user (file name: BP-DEF_USER). The definitions defined in the BP-DEF for user customize define override the definitions in the default BP-DEF that is loaded.

The BP-DEF for user customize defines only portions of definitions in the default BP-DEF (i.e., differences). In addition, definitions of commands to be used should not be defined in the BP-DEF for user customize, and any command definition is ignored. It is desirable that commands that are to be used are defined in the default BP-DEF.

In this embodiment, it is assumed that the customize A and the customize B are switched for system customize in a printed board CAD, and the BP-DEF for user customize is used in an infra CAD. In addition, the BP-DEFs described above may have a hierarchical structure for system customize and user customize.

Figure 3:
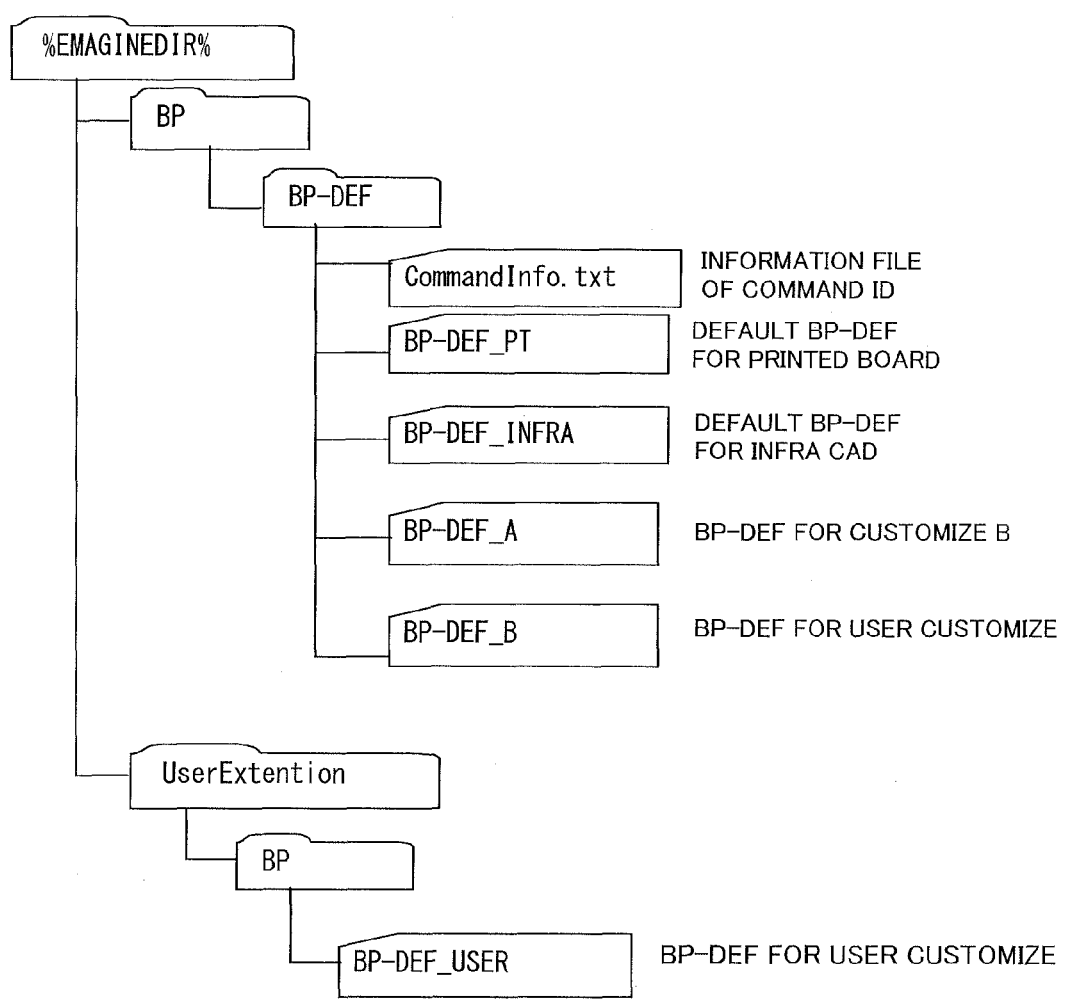
FIG. 3 is a diagram illustrating an example of how each file is stored in an information processing apparatus as one example of an embodiment.

FIG. 3 is a diagram illustrating an example of how each file is stored in information processing apparatus as one example of an embodiment. In the example depicted in FIG. 3, a folder "BP" and a folder "UserExtention" are created under a folder "%EMAGINEDIR%" in the storage device 21. In addition, a folder "BP-DEF" is created under a folder "BP", and a CommandInfo.txt, a BP-DEF_PT, a BP-DEF_INFRA, a BP-DEF_A, and a BP-DEF_B are stored in the folder "BP-DEF".

Furthermore, a folder "BP" is created under a folder "User-Extention", and a BP-DEF_USER is stored in the folder "BP".

The CommandInfo.text will be described later in detail. In addition, the places where the files are stored are not limited to those depicted in this example depicted in FIG. 3, and they may be varied.

Figure 4:
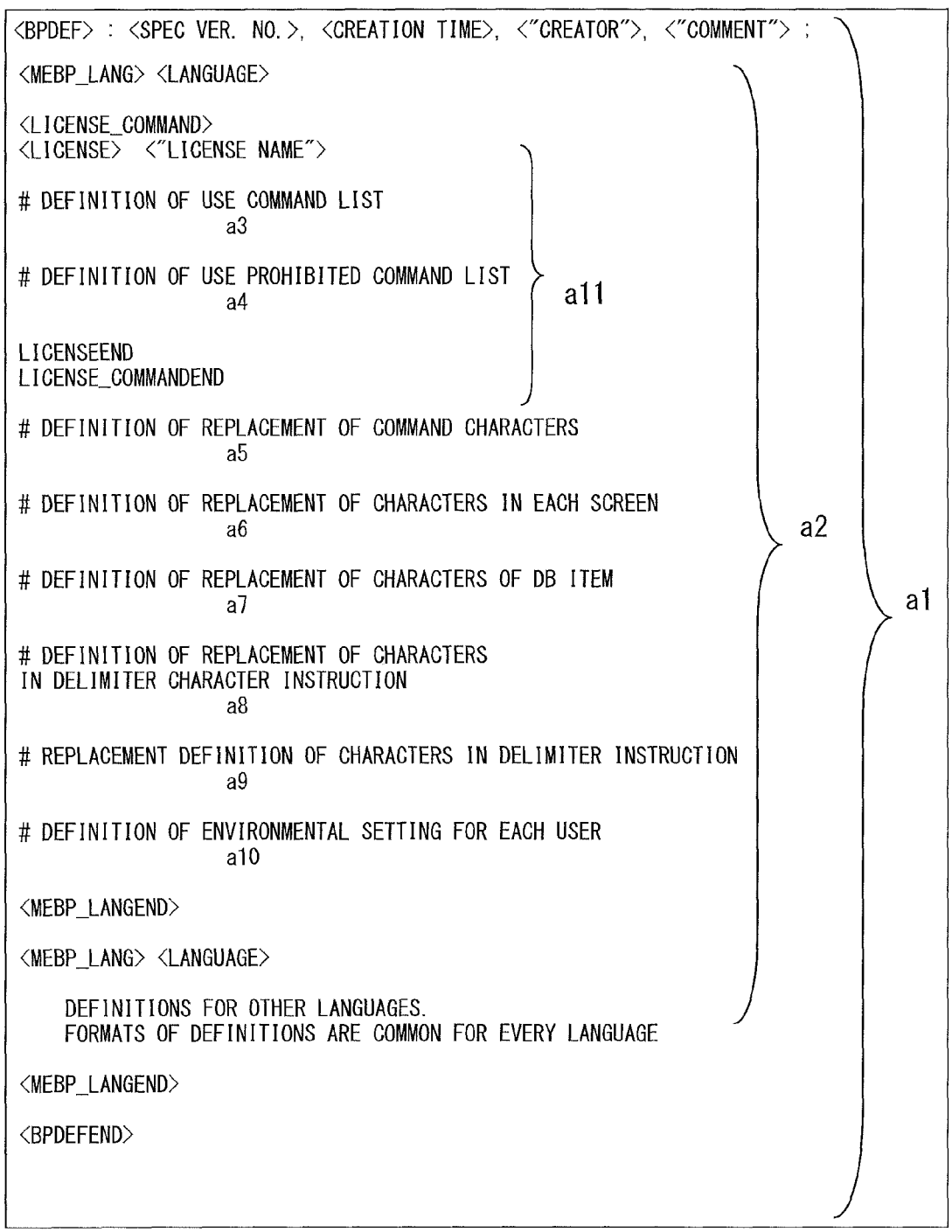
FIG. 4 is a diagram illustrating an example of a definition format of a BP-DEF used in an information processing apparatus as one example of an embodiment.

FIG. 4 is a diagram illustrating an example of a definition format of a BP-DEF used in an information processing apparatus as one example of an embodiment.

The definition format of BP-DEF (the resource definition file 202) contains a BP-DEF information definition section a1, a language information definition section a2, a use command definition section a3, a use prohibited command definition section a4, a command character replacement definition section a5, a screen character replacement definition section a6, a DB item character replacement definition section a7, a delimited message character replacement definition section a8, a prohibited command release definition section a9, an user-specific environmental setting definition section a10, and a license control definition section a11, as depicted in FIG. 4, for example.

Hereinafter, the statement following the symbol "#" is treated as a comment, and thus is ignored. In addition, a definition across multiple lines is not allowed. Furthermore, for using a double quotation (") in a string, a back slash should be placed before a double quotation, as in "¥"".

Hereinafter, each definition section in a BP-DEF will be explained.

(1) BP-DEF Information Definition Section

Figure 5:
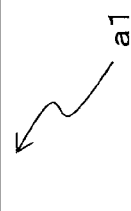
FIG. 5 is a diagram exemplifying a format of an information definition section in a BP-DEF as one example of an embodiment.
Figure 6:
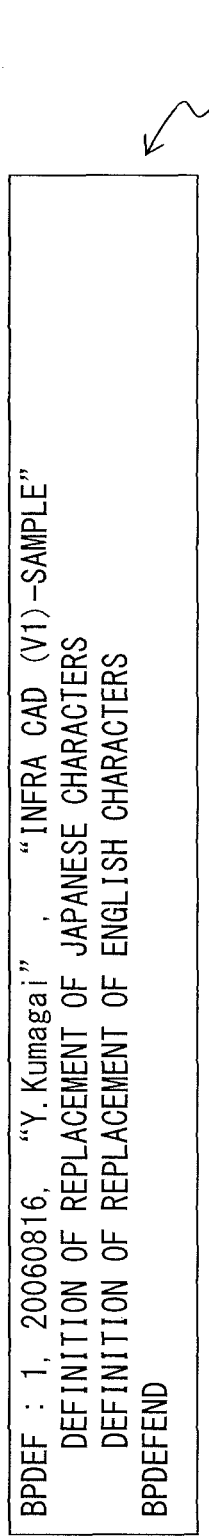
FIG. 6 is a diagram illustrating an example of the definition in an information definition section in a BP-DEF as one example of an embodiment.

FIG. 5 is a diagram exemplifying a format of a information definition section a1 in a BP-DEF as one example of an embodiment; and FIG. 6 is a diagram illustrating an example of the definition thereof.

In a BP-DEF information definition section a1, a use command definition, a character replacement instruction, and the like are described for each language between a tag <BPDEF> and a tag <BPDEFEND>. In addition, only a <"comment"> is optional, and other entries are mandatory.

In the example depicted in FIG. 6, in the fields of "Definition of replacement of Japanese characters" and "Definition of replacement of English characters", a language information definition section a2, a use command definition section a3, a use prohibited command definition section a4, a command character replacement definition section a5, a screen character replacement definition section a6, a DB item character replacement definition section a7, a delimited message character replacement definition section a8, a prohibited command release definition section a9, an user-specific environmental setting definition section a10, and a license control definition section a11 are respectively described.

(2) Language Information Definition Section

Figure 7:
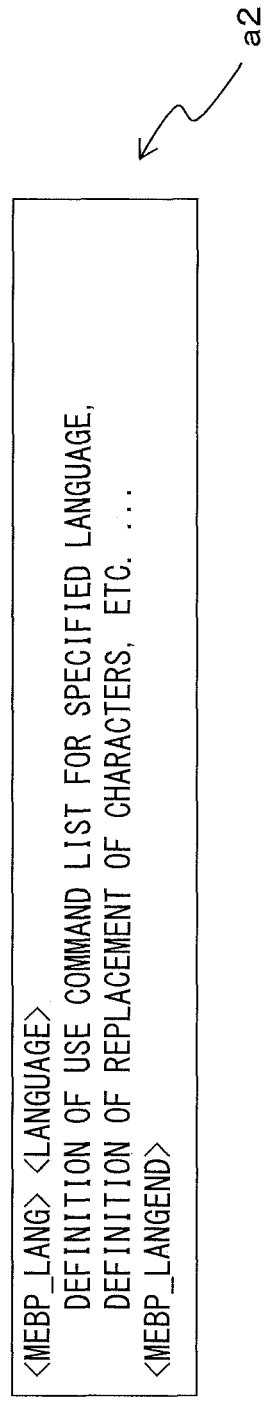
FIG. 7 is a diagram exemplifying a format of a language information definition section as one example of an embodiment.
Figure 8:
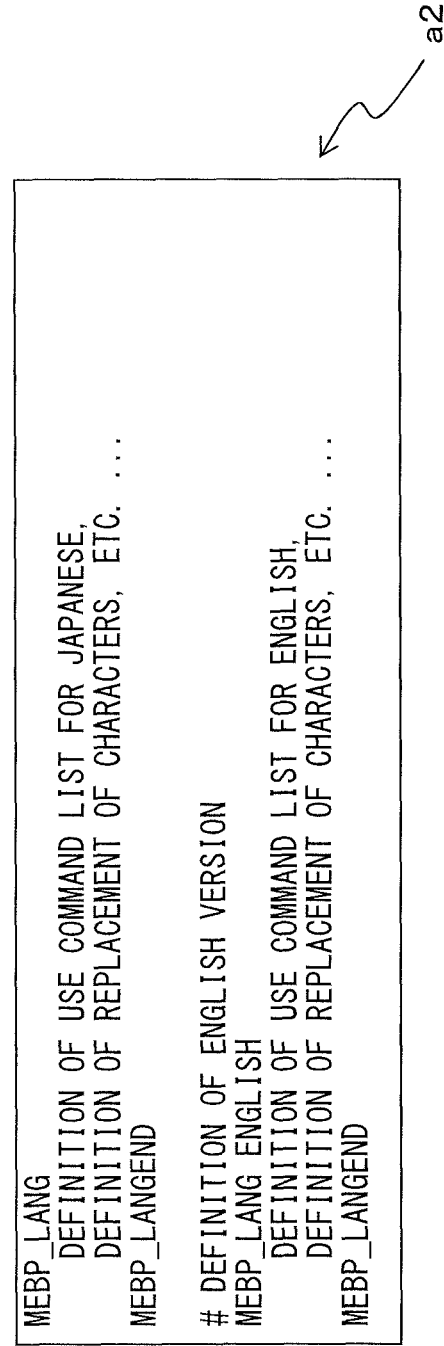
FIG. 8 is a diagram illustrating an example of the definition in a language information definition section as one example of an embodiment.

FIG. 7 is a diagram exemplifying a format of a language information definition section a2 as one example of an embodiment; and FIG. 8 is a diagram illustrating an example of the definition thereof.

In a language information definition section a2, a definition of a use command list and a character replacement instruction for a specified language are described between a tag <MEBP_LANG> and a tag <MEBP_LANGEND>.

Specifically, in the field of "Definition of use command list for Japanese, definition of replacement of characters, etc. . . . " and "Definition of use command list for English, definition of replacement of characters, etc. . . . ", a use command definition section a3, a use prohibited command definition section a4, a command character replacement definition section a5, screen character replacement definition unit a6, a DB item character replacement definition section a7, a delimited message character replacement definition section a8, a prohibited command release definition section a9, an user-specific environmental setting definition section a10, and a license control definition section a11 are described in the example depicted in FIG. 8.

Note that the <language> is specified as follows:
JAPANESE: Japanese (default, optional)
ENGLISH: English In addition, for inheriting the definitions for the Japanese environment into the English environment, see the section "(12) Others" below.

The language information definition section a2 is defined for each language to be used.

(3) Use Command Definition Section

Figure 9:
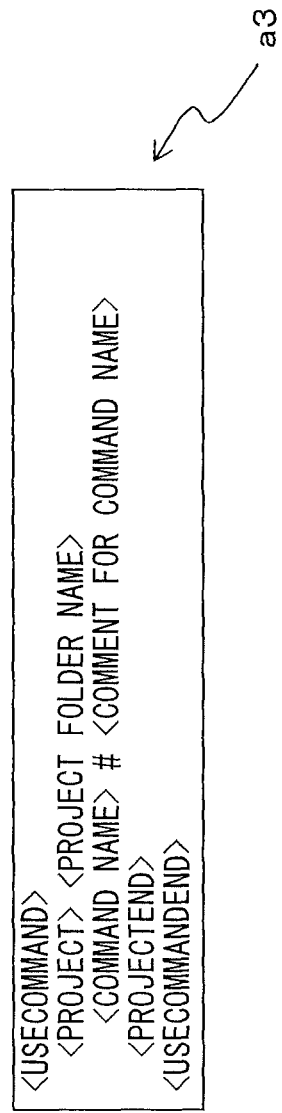
FIG. 9 is a diagram exemplifying a format of a use command definition section as one example of an embodiment.

FIG. 9 is a diagram exemplifying a format of a use command definition section a3 as one example of an embodiment; and FIG. 10 is a diagram illustrating an example of the definition thereof.

In a use command definition section a3, a definition of a use command list is described between a tag <USECOMMAND> and a tag <USECOMMANDEND>. The use command list is defined by listing command names.

The command names are defined for each project, and commands for permitting to be used in the project are defined between a tag <PROJECT> and a tag <PROJECTEND>. Note that a folder name of the project (hereinafter, sometimes referred to as the "project name") is to be specified in capital letters, and a command name is defined in the format of "ID_xxx". Note that for an "ID_xxx", "xxx" stands for any string in an arbitrary digit number.

A use command is defined only by "ID_xxx", it is difficult to know the corresponding command. Therefore, it is desirable to add a string (command string, related information) describing information about the command, such as the description of command, for example, as a comment, for each command name.

In the default BP-DEF, usage of any commands that are not defined in the use command definition section a3 is prohibited. For example, such a command is grayed out on a menu. In addition, a definition of a use command list is available only in a default BP-DEF. Accordingly, even if a use command list is defined in a BP-DEF for customize, the use command list registered in the BP-DEF for customize is ignored.

In the example depicted in FIG. 10, for a project "MEBP", ID_BP_FILE_OPEN, ID_BP_FILE_CLOSE, ID_BP_FILE_SAVE, ID_EDIT_PART_COPY, and ID_EDIT_PART_COPY are defined as usable commands. Also in the example depicted in FIG. 10, for a project "EDITATTR", ID_SAVE_TO_CSV_OVERWRITE, ID_SAVE_TO_CSV, ID_LIST_DLG_MENUITEM_START_EDITATTR, and ID_LIST_DLG_MENUITEM_DELETE_LAYOUT are defined as usable commands.

(4) Use Prohibited Command Definition Section

Figure 11:
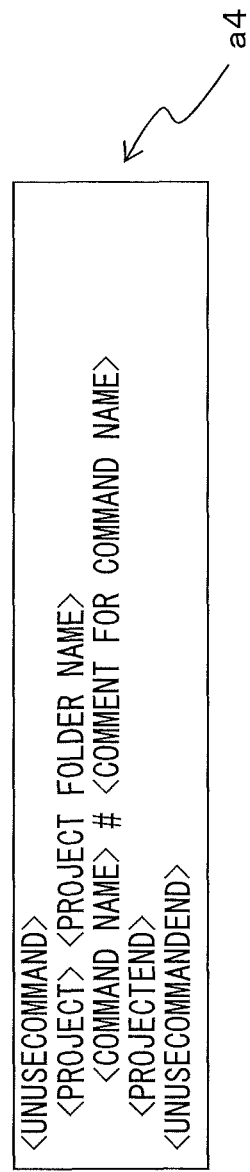
FIG. 11 is a diagram exemplifying a format of a use prohibited command definition section as one example of an embodiment.
Figure 12:
FIG. 12 is a diagram illustrating an example of the definition in a use prohibited command definition section as one example of an embodiment.

FIG. 11 is a diagram exemplifying a format of a use prohibited command definition section a4 as one example of an embodiment; and FIG. 12 is a diagram illustrating an example of the definition thereof.

In a use prohibited command definition section a4, the definition of a usage prohibited command list (use prohibited command list) is described between a tag <UNUSECOMMAND> and a tag <UNUSECOMMANDEND>. The use prohibited command list is defined by listing command names.

The command names are defined for each project, and commands for permitting to be used in the project are defined between a tag <PROJECT> and a tag <PROJECTEND>. Note that a folder name of the project is to be specified in capital letters, and a command name is defined in the format of "ID_xxx".

Also in the case of a use prohibited command, its definition is only provided by a command name, such as "ID_xxx", it is desirable to add related information as a comment.

Even if a command that is defended as use prohibited commands in a default BP-DEF is defined as a use command in a BP-DEF for customize, the use prohibited definition in the default BP-DEF is assigned higher priority and remains as use prohibited command.

TABLE 1

|  | DEFAULT BP-DEF DEFINITION | BP-DEF DEFINITION FOR CUSTOMIZE | COMMEND USABLE? |
|---|---|---|---|
| COMMAND A | DEFINED AS USE COMMAND | DEFINED AS USE PROHIBITED COMMAND | UNUSABLE |
| COMMAND B | DEFINED AS USE PROHIBITED COMMAND | DEFINED AS USE COMMAND | UNUSABLE |

In other words, for example, as listed in Table 1, usage of Command A that is defined as a use command in a default BP-DEF but defined as a use prohibited command in a BP-DEF for customize is prohibited. Usage of Command B that is defined as a use prohibited command in a default BP-DEF but defined as a use command in a BP-DEF for customize is also prohibited.

Here, why a use prohibited command definition section a3 is required will be explained.

If a user could only define use commands and desire to define a certain command as use prohibited command, the user would have write a use command definition section a3 in one of following two patterns, Patterns 1 and 2:

Pattern 1: The user defines the comment in a use command list, but comments it out by inserting "#" in the beginning.
Pattern 2: Do not define the command in the use command list.

These patterns work well only with the default BP-DEF, a problem may arise if a certain user desires to define a use prohibited command in a BP-DEF for customize for that user.

For example, let's assume that, in Pattern 1 described above, an existing command A that has been defined as a use command in a default BP-DEF is commented out in a BP-DEF for user customize by adding "#" as a use prohibited command. A new command B is added, the command B is defined in the default BP-DEF as a use command.

TABLE 2

|  | DEFAULT BP-DEF DEFINITION | BP-DEF DEFINITION FOR USER CUSTOMIZE | COMMEND USABLE? |
|---|---|---|---|
| EXISTING COMMAND A | DEFINED AS USE COMMAND | WANT TO PROHIBIT BY ADDING "#" | UNUSABLE |
| ADDED COMMAND B | DEFINED AS USE COMMAND | UNDEFINED | UNUSABLE |

In such a case, the command B is not enlisted in the use command list in the BP-DEF for user customize, as depicted in Table 2. Although the user desires to define the command B as usable, the commend B would be treated as unusable in Patterns 1 and 2 described above.

TABLE 3

|  | DEFAULT BP-DEF DEFINITION | BP-DEF DEFINITION FOR USER CUSTOMIZE | COMMEND USABLE? |
|---|---|---|---|
| EXISTING COMMAND A | DEFINED AS USE COMMAND | DEFINED AS USE PROHIBITED COMMAND | UNUSABLE |
| ADDED COMMAND B | DEFINED AS USE COMMAND | UNDEFINED | USABLE |

To solve this situation, the concept of definitions of use prohibited commands has been introduced to explicitly define unusable commands (see Table 3).

In the example depicted in FIG. 12, for the project "MEBP", ID_BP_FILE_SAVE is defined as an unusable command. Also in the example depicted in FIG. 10, for the project "EDITATTR", ID_LIST_DLG_MENUITEM_START_EDITATTR and ID_LIST_DLG_MENUITEM_DELETE_LAYOUT are defined as unusable commands.

(5) Command Character Replacement Definition Section

Figure 13:
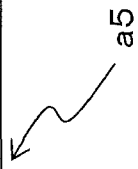
FIG. 13 is a diagram exemplifying a format of a command character replacement definition section in a BP-DEF as one example of an embodiment.
Figure 14:
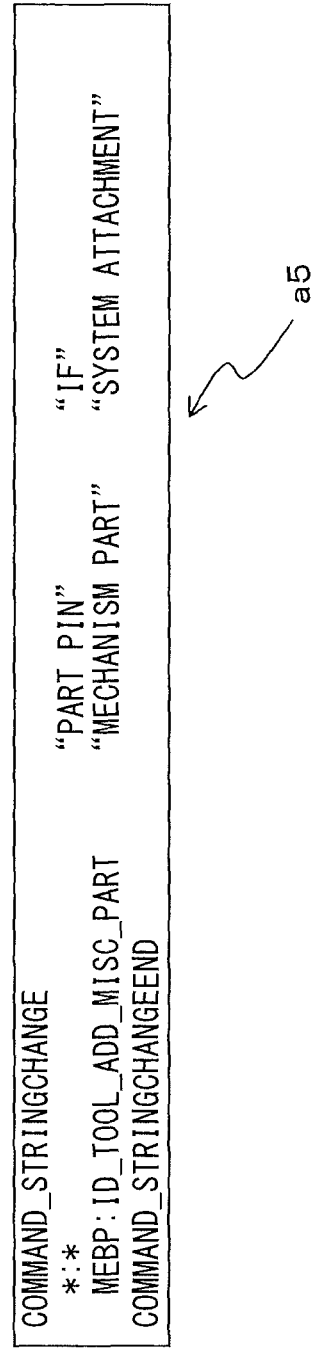
FIG. 14 is a diagram illustrating an example of the definition in a command character replacement definition section in a BP-DEF as one example of an embodiment.

FIG. 13 is a diagram exemplifying a format of a command character replacement definition section a5 in a BP-DEF as one example of an embodiment; and FIGS. 14 and 15 are diagrams illustrating examples of their respective definitions.

In a command character replacement definition section a5 in a BP-DEF, a character replacement for a command is defined between a tag <COMMAND_STRINGCHANGE> and a tag<COMMAND_STRINGCHANGEEND>. Specifically, after a command name of the command to be replaced, a replaced string and a replacing string are written side by side.

Note that the command names are defined for each project, and commands for permitting to be used in the project are defined between a tag <PROJECT> and a tag <PROJECTEND>. Note that a folder name of the project is to be specified in capital letters, and a command name is defined in the format of "ID_xxx".

If there is a match with a replaced string, that character is replaced with a replacing string (the character match is not a perfect match, but a partial match). In addition, for replacing all commands in all projects, "*" is specified. Furthermore, all entries are mandatory.

In the example depicted in FIG. 14, the string "parts pin" in all commands is to be replaced with the string "IF", and the string "mechanism part" in the command ID_TOOL_ADD_MISC_PART in the project "MeBP" is to be replaced with the string "system attachment".

In the example depicted in FIG. 15, the string "AA" in all commands under the project "MeBP" is to be replaced with the string "BB", and the string "mechanism part" in the command ID_TOOL_ADD_MISC_PART under each project is to be replaced with the string "system attachment".

(6) Screen Character Replacement Definition Section

Figure 16:
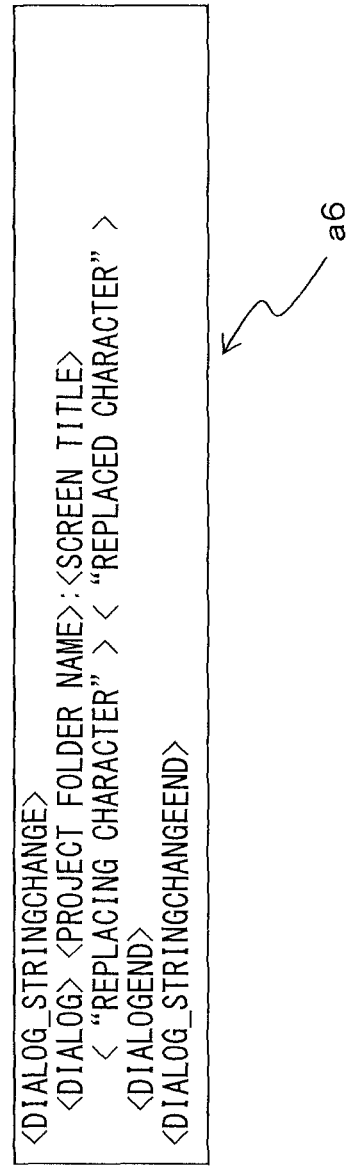
FIG. 16 is a diagram exemplifying a format of a screen character replacement definition section as one example of an embodiment.

FIG. 16 is a diagram exemplifying a format of a screen character replacement definition section a6 as one example of an embodiment; and FIG. 17 is a diagram illustrating an example of the definition thereof.

In a screen character replacement definition section a6, a definition of character replacement in each screen is described between a tag <DIALOG STRINGCHANGE> and a tag <DIALOG_STRINGCHANGEEND>. Specifically, a replaced string and a replacing string are written side by side.

Note that definitions for character replacements are specified for each screen, and the definition for character replacements are described between a tag <DIALOG> and a tag <DIALOGEND>. For, a tag <DIALOG>, a "project folder name" of the screen to be replaced and its "screen title" are written side by side, by separating by double colon ":".

The project folder name is to be specified in capital letters, In addition, if there is a match with a replaced string, that character is replaced with a replacing string (the character match is not a perfect match, but a partial match).

In a technique for replacing characters by specifying a command name in a screen, it is not possible to uniquely identify a command name in the screen since a command name "IDC_STATIC" can be defined multiple times in the screen. By replacing characters with a string match as in this technique, any characters in the screen can be reliably replaced. In addition, for replacing all screens, "*" is specified. Furthermore, all entries are mandatory.

In the example depicted in FIG. 17, in all screens, the string "parts pin" is to be replaced with the string "IF", and the string "pin name" is to be replaced with the string "IF name". Furthermore, in the "mechanism part entry" screen in the project "MeBP", the string "mechanism part entry" is to be replaced with the string "system attachment entry", and the string "special prepare instruction" is to be replaced with the string "borrow/carry-in". In addition, the string "entered part information" is to be replaced with the string "entered product information", the string "part name" is to be replaced with the string "product name", and the string "entered part information" is to be replaced with the string "entered product information".

7) DB Entry Character Replacement Definition Section

Figure 18:
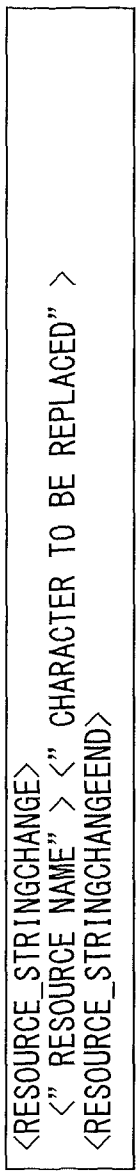
FIG. 18 is a diagram exemplifying a format of a DB item character replacement definition section as one example of an embodiment.
Figure 19:
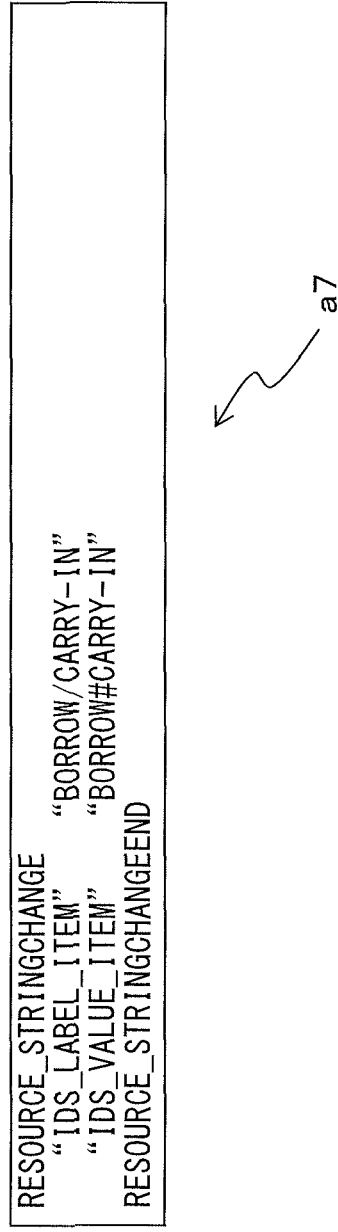
FIG. 19 is a diagram illustrating an example of the definition in a DB item character replacement definition section as one example of an embodiment.

FIG. 18 is a diagram exemplifying a format of a DB entry character replacement definition section a7 as one example of an embodiment; and FIG. 19 is a diagram illustrating an example of the definition thereof.

A DB entry character replacement definition section a7 is an instruction for items (such as labels, values) of a DB that is commonly looked up by all projects defined in resources of BPDEF project.

Specifically, definition for a character replacement is described between a tag <RESOURCE_S-TRINGCHANGE> and a tag <RESOURCE_S-TRINGCHANGEEND>. Specifically, a replaced string and a replacing string are written side by side.

Note that definitions for string replacements are specified for each screen, and the definition for string replacements are described between a tag <DIALOG> and a tag <DIALOGEND>. In a definition for a character replacement, a resource name to be replaced and a modifying string are written side by side. In addition, the resource name is specified in the following format:

Label: "IDS_LABEL_XXX"
Value: "IDS_VALUE_XXX"

FIG. 19 depicts an example in which strings IDS_LABEL_XXX and IDS_VALUE_XXX are to be replaced.

Let's assume that the following Function (1) is depicted in a BPDEF project, and resource names defined in a BP-DEF are referenced from this function.

tring LoadStringBPDef("IDS_LABEL_xxx") (1)

This Function (1) operates in the following processing manner:

(i) If a resource name specified in the argument is defined in a BP-DEF, Function (1) returns the defined string.

(ii) If a resource name specified in the argument is not defined in the BP-DEF, Function (1) obtains a corresponding string from resources in the BPDEF project and returns it.

Since a resource ID specified in the argument is a string, Function (1) obtains a command ID in a numerical value by looking up a CommandInfo.txt, which will be described later, and obtains the corresponding string from the resources.

(8) Delimited Message Character Replacement Definition Section

Figure 20:
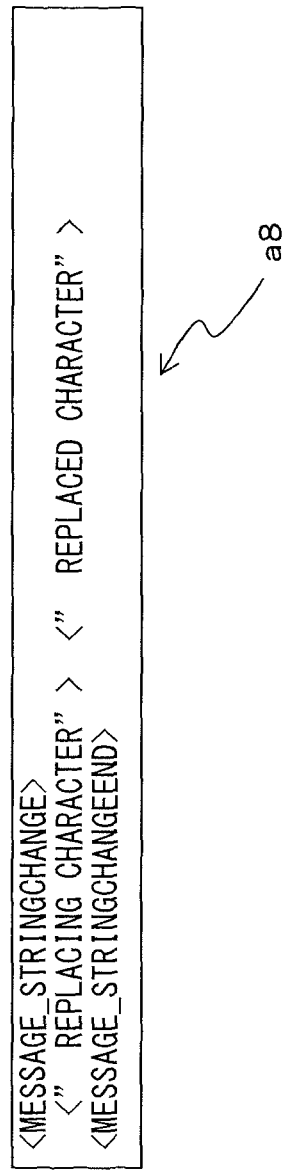
FIG. 20 is a diagram exemplifying a format of a delimited message character replacement definition section as one example of an embodiment.
Figure 21:
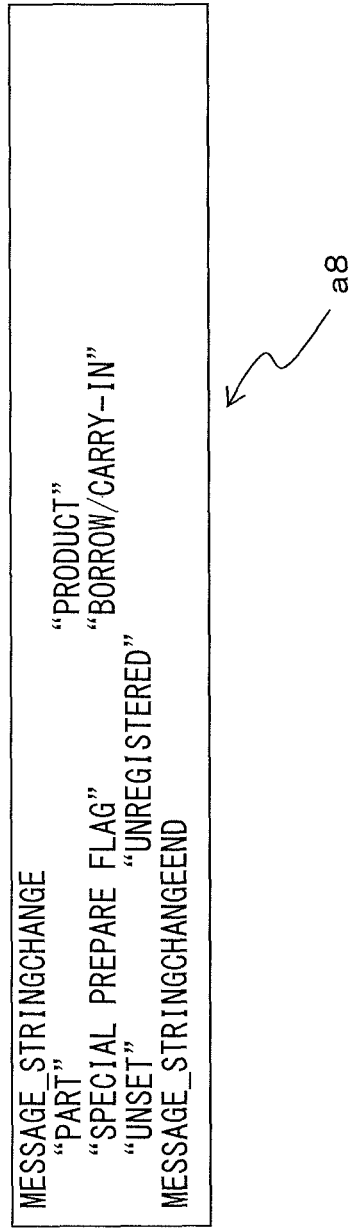
FIG. 21 is a diagram illustrating an example of the definition in a delimited message character replacement definition section as one example of an embodiment.

FIG. 20 is a diagram exemplifying a format of a delimited message character replacement definition section a8 as one example of an embodiment; and FIG. 21 is a diagram illustrating an example of the definition thereof.

A delimited message character replacement definition section a8 defines an instruction to replace, for a string with delimiters, the string enclosed between the delimiters with another string. In a delimited message character replacement definition section a8, a definition for a character replacement in a string with delimiters is described between a tag <MESSAGE_STRINGCHANGE> and a tag <MESSAGE_STRINGCHANGEEND>. Specifically, a replaced string and a replacing string are written side by side.

As used herein, "delimiters" are a predetermined specific string, and strings "!["and"]!" are used as delimiters in this embodiment. In a string containing the strings "![" and "]!", any character(s) sandwiched (enclosed) between the delimiters "![" and "]!" are to be replaced with a replacing string.

Note that in a delimited message character replacement definition section a8, specifying project names, screen titles, and the like is not necessary. If characters delimited by the delimiters matches the replacing characters, it is replaced with the replacing string (the character match is a perfect match).

In the example depicted in FIG. 21, in the statement (delimited message) "![Parts]!(% sPART %) cannot set ![special prepare flag]!. Set ![unset]!.", strings "part", "special prepare flag", and "unset" are replaced with string "product", "borrow/carry-in", and "unregistered", respectively.

Thereby, the message "Parts (% sPART %) cannot set special prepare flag. Set unset." is rewritten into "Products (% sPART %) cannot set borrow/carry-in. Set unregistered.".

Generally, an instruction to replace some words in a message statement by rote may rewrite the message in the manner a programmer does not expect.

For example, "yes/no" in a special prepare instruction for a printed board CAD is changed to "borrow/carry-in" for an infra CAD. In such a case, simple replacement of the string "yes" to the string "borrow" may replace even unintended "yes" to "borrow".

For this reason, in this embodiment, any words in a message which are expected to be replaced are delimited by the delimiters (![, ]!), and the delimiters are deleted before displaying the message. By specifying in this manner, the string between the delimiters is recognized as a single word, which undergoes character match and character replacement. Here is an example of a definition of a message statement:

NO:934 LVL:WAR ID:CANNOT_SET_PREPARE
! [Parts] ! (%sPART%) cannot set ! [special prepare] !.
Set ! [unset] !.

(9) Prohibited Command Release Definition Section

Figure 23:
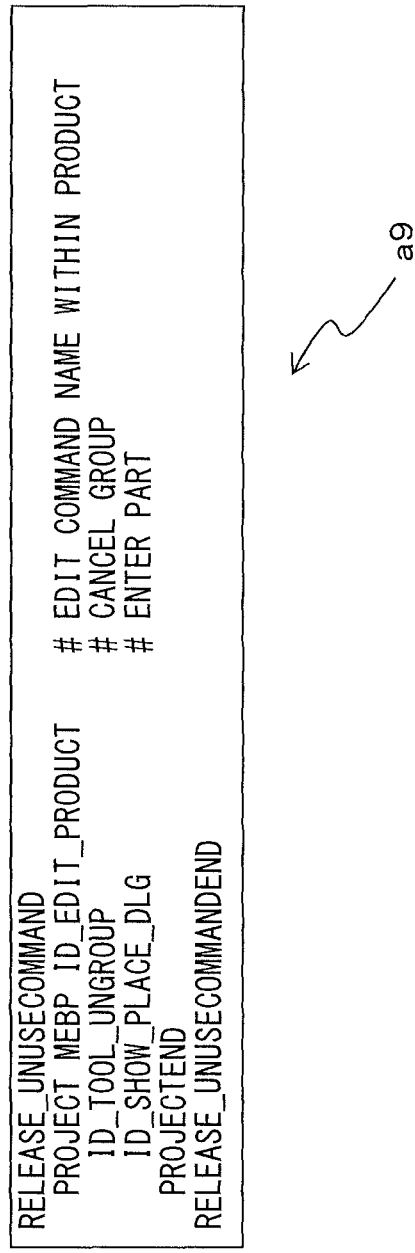
FIG. 23 is a diagram illustrating an example of the definition in a prohibited command release definition section as one example of an embodiment.

FIG. 22 is a diagram exemplifying a format of a prohibited command release definition section a9 as one example of an embodiment; and FIG. 23 is a diagram illustrating an example of the definition thereof.

A prohibited command release definition section a9 defines an instruction to release a use prohibited command during execution of the specified command.

Specifically, a definition of commands for releasing use prohibited is listed between a tag <RELEASE_UNUSECOMMAND> and a tag <RELEASE_UNUSECOMMANDEND>. The commands for releasing use prohibited are defined by listing command names.

The command names are defined for each project, and commands for releasing use prohibited in the project are defined between a tag <PROJECT> and a tag <PROJECTEND>. For, a tag <PROJECT>, a "project folder name" concerned and a command name to be executed are written side by side. Note that a folder name of the project is to be specified in capital letters, and a command name is defined in the format of "ID_xxx".

Also in the case of a command for releasing use prohibited, its definition is only provided by a command name, such as "ID_xxx", it is desirable to add related information as a comment.

After the execution of the command concerned is completed, the command for which use prohibited is released returns to a use prohibited command.

In the example depicted in FIG. 23, in the project "MEBP", during an execution of the command "ID_EDIT_PRODUCT", the command "ID_TOOL_UNGROUP" of "Ungroup" and the command "ID_SHOW_PLACE_DLG" of "Enter part" are set as executable.

FIGS. 24 and 25 are diagrams exemplifying a definition of an API function related to the operation of a prohibited command release definition section in an information processing apparatus as one example of an embodiment. Note that FIG. 24 is a diagram illustrating an example of an API temporally releasing a use prohibited command, while FIG. 25 is a diagram illustrating an example of an API returning the temporally release use prohibited command to a use prohibited command.

It is desirable to use a prohibited command release definition section a9 in the following manner.

More specifically, as depicted in FIG. 24, the API temporally releasing a use prohibited command during an execution of the command is defined in the BPDEF project.

Also as depicted in FIG. 25, an API returning the temporally release use prohibited command to a use prohibited command at the end of the command is also defined in the BPDEF project.

(10) License Control Definition Section

Figure 26:
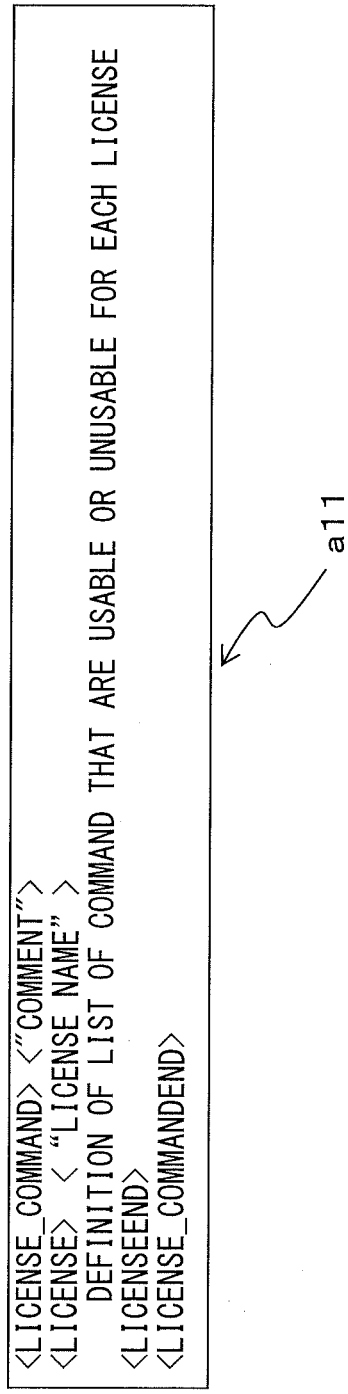
FIG. 26 is a diagram exemplifying a format of a license control definition section as one example of an embodiment.
Figure 27:
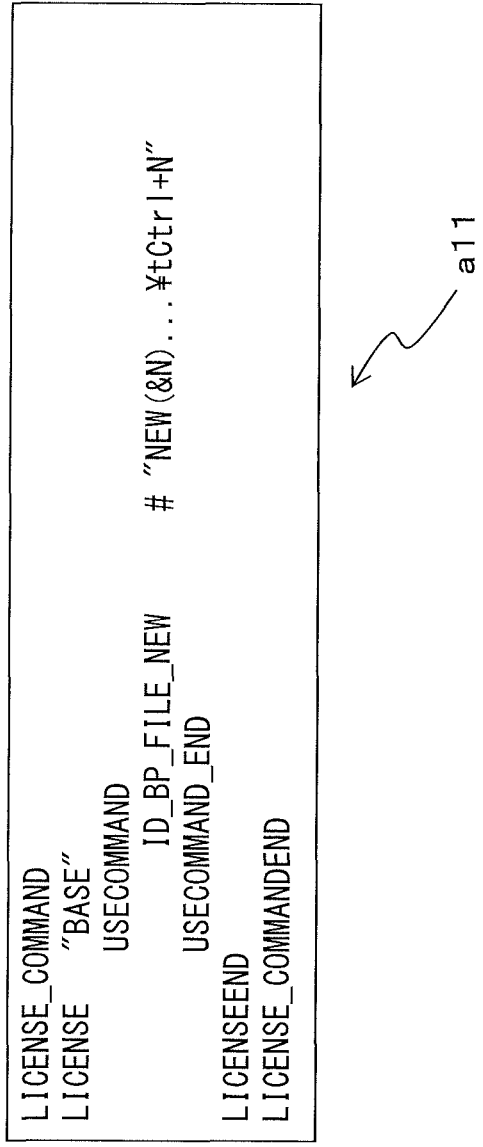
FIG. 27 is a diagram illustrating an example of the definition in a license control definition section as one example of an embodiment.

FIG. 26 is a diagram exemplifying a format of a license control definition section a11 as one example of an embodiment; and FIG. 27 is a diagram illustrating an example of the definition thereof.

A license control definition section a11 is a definition to specify commands as command or unusable for each license, and specifies commands to set as usable and commands to set as unusable according to a license type.

Specifically, a definition of usable commands is listed between a tag <LICENSE> and a tag <LICENSEEND>. Specifically, usable command names are defined, for example. In addition, in a tag <LICENSE>, "license names" that are concerned are listed. Note that only a <"comment"> is optional, and other entries are mandatory.

In the example depicted in FIG. 27, for a license name "BASE", a command ID_BP_FINE_NEW is set as usable.

(11) User-Specific Environmental Setting Definition Section

Figure 28:
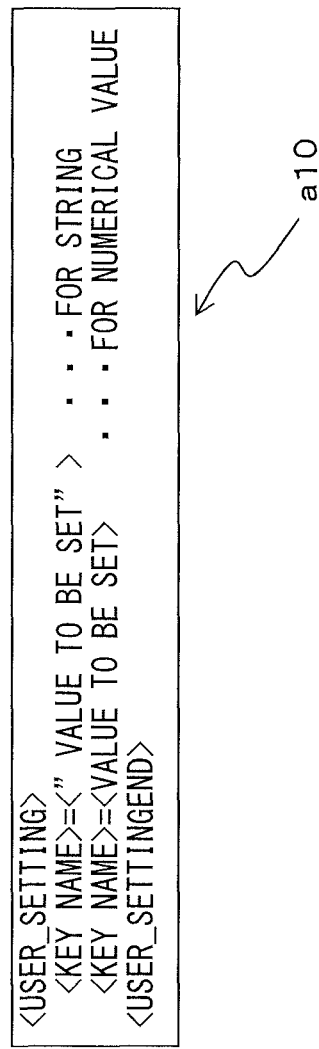
FIG. 28 is a diagram exemplifying a format of a user-specific environmental setting definition section as one example of an embodiment.

FIG. 28 is a diagram exemplifying a format of a user-specific environmental setting definition section a10 as one example of an embodiment;

A user-specific environmental setting definition section a10 defines user-specific environmental settings, and a definition of the environmental settings is described between a tag <USER_SETTING> and a tag <USER_SETTINGEND>.

The description format of <key name>=<value to be set> is the same as that in ini files. Since colons (:) are treated as delimiters, any colons in a server path definition (such as http://) should be enclosed by double quotations (",") in a string specified in <value to be set> to prevent the colon in the server path definition from being treated as a delimiter.

In a user-specific environmental setting definition section a10, access paths to various servers (data servers, web servers, library servers) (server paths) to which the application program 201 is to be connected may be registered.

Furthermore, in the user-specific environmental setting definition section a10, access paths to various servers that can be accessed may be registered in advance, and a flag to permit a reference to a path to allow an access thereto (for example "1") may be set to that path. In addition, the maximum count for the paths to allow accesses thereto may be set.

The user-specific environmental setting definition section a10 may also contain a definition of tool bars that can be used.

Figure 29:
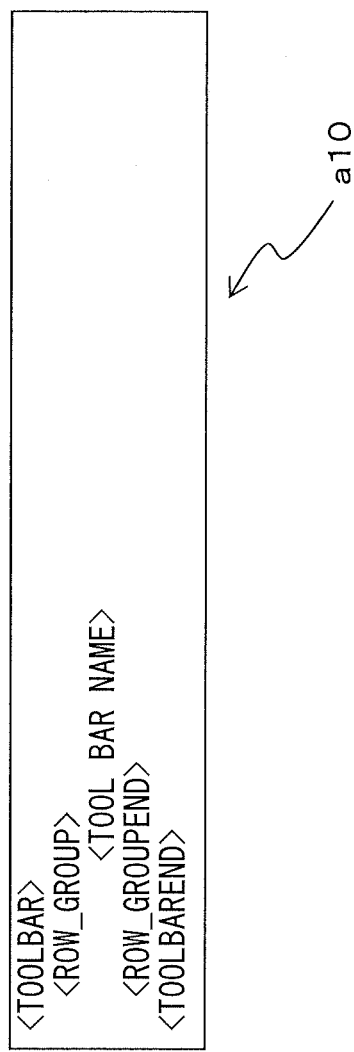
FIG. 29 is a diagram exemplifying a format of a tool bar definition in a user-specific environmental setting definition section as one example of an embodiment.
Figure 30:
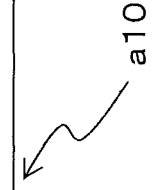
FIG. 30 is a diagram illustrating an example of the definition in a user-specific environmental setting definition section as one example of an embodiment.

FIG. 29 is a diagram exemplifying a format of a tool bar definition in a user-specific environmental setting definition section a10 as one example of an embodiment; and FIG. 30 is a diagram illustrating an example of the definition thereof.

A tool bar definition describes a definition of tool bar codes to be used between a tag <TOOLBAR> and a tag <TOOLBAREND>. Note that tool bars are defined for each row, and tool bars for a single row is defined between a tag <ROW_GROUP> and a tag <ROW_GROUPEND>. In addition, tool bar names used for identifying the tool bars are defined in the format of "ID_xxx".

In the example depicted in FIG. 30, the command "ID_VIEW_TOOLBAR" and the command "ID_VIEW_TOOLBAR_EDIT" are set as tool bars in the first row, while the command "ID_VIEW_TOOLBAR_FIND" and the command "ID_VIEW_TOOLBAR_LIST" are set as tool bars in the second row.

In addition, a user-specific environmental setting definition section a10 may contain a definition to display or hide display windows.

Figure 31:
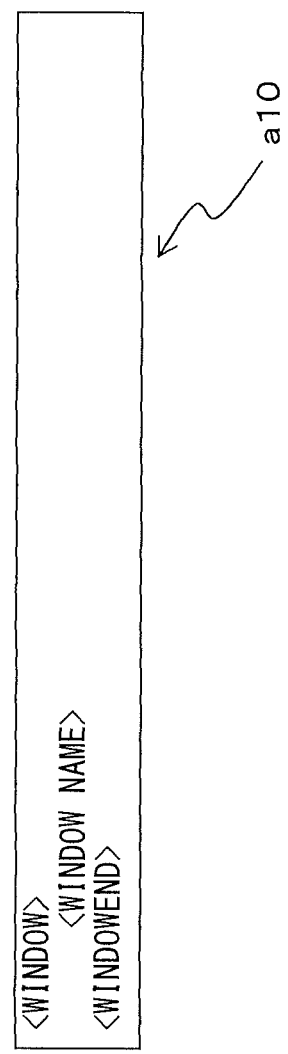
FIG. 31 is a diagram exemplifying a format of a display window definition in a user-specific environmental setting definition section as one example of an embodiment.
Figure 32:
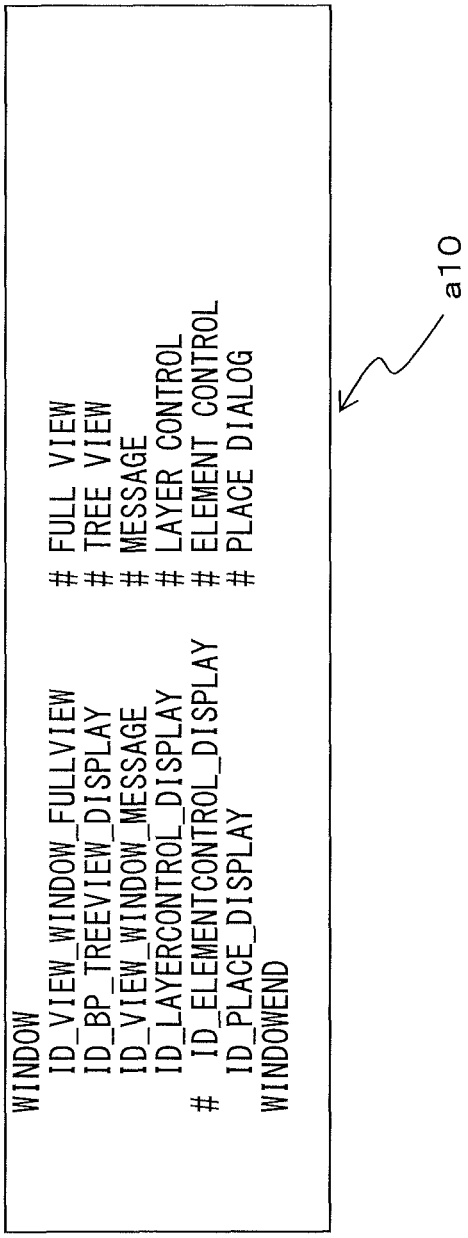
FIG. 32 is a diagram illustrating an example of the definition in a display window definition in a user-specific environmental setting definition section as one example of an embodiment.

FIG. 31 is a diagram exemplifying a format of a display window definition in a user-specific environmental setting definition section a10 as one example of an embodiment; and FIG. 32 is a diagram illustrating an example of the definition thereof.

A display window definition described a definition of windows for control to display or hide between a tag <WINDOW> and a tag <WINDOW>. Specifically, to define windows, window names for identifying the window are described. Note that the window names are defined in the format of "ID_xxx". In addition, any display windows of which window IDs are not defined in this field is not displayed.

In the example depicted in FIG. 32, the windows related to ID_VIEW_WINDOW_FULLVIEW, ID_BP_TREEVIEW_DISPLAY, ID_VIEW_WINDOW_MESSAGE, ID_LAYERCONTROL_DISPLAY, and ID_PLACE_DISPLAY are set to be displayed, while the window related to ID_ELEMENTCONTROL_DISPLAY set not to be displayed.

(12) Others

In some definitions in BP-DEFs have common definitions both in Japanese and in English. Thus, creating definitions for each language is tedious and some definition may be missed. Accordingly, this embodiment provides a mechanism in which a definition in a particular language environment (for example, Japanese environment) is set as base definitions such that the definitions in the base Japanese environment can be inherited to other languages.

Specifically, if a user desires to inherit definitions in the base Japanese environment for a certain category, by omitting the definition of that category in definitions in a language other than the base Japanese, the definitions are inherited to that language. If the user does not desire to inherit a definition of a certain category, a null definition is specified in the definitions of that category, for example. This facilitates definitions in languages other than the base language and prevents any missing definitions, thereby improving the reliability.

Figure 33:
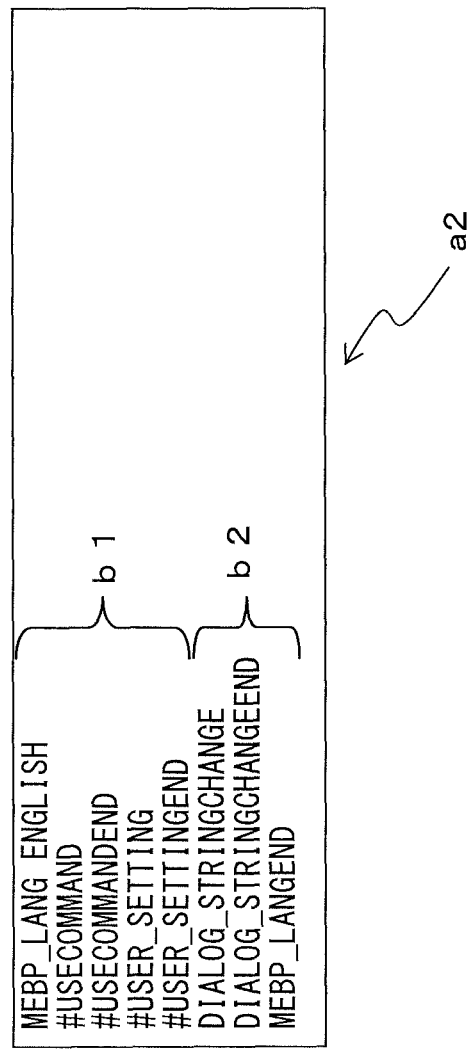
FIG. 33 is a diagram illustrating an example of a language information definition section for a language other than the base language in an information processing apparatus as one example of an embodiment.

FIG. 33 is a diagram illustrating an example of a language information definition section a2 for a language other than the base language in an information processing apparatus as one example of an embodiment.

The example depicted in FIG. 33 exemplifies definitions in the English environment as a language other than the base language, and the command "USECOMMAND" and the command "USER_SETTING" are commented out by inserting "#" in the beginning of the lines (see Symbol B1). In addition, the command "DIALOG_STRINGCHANGE" is a full definition having no definition therein.

In such a case, category definitions indicated by Symbol b1 are treated as undefined, and the definitions in the Japanese environment are to be inherited. In contrast, since the category definition indicated by Symbol b2 is a full definition, the corresponding definition in the Japanese environment is not inherited.

If a definition of a category that is language-independent, such as character replacement definitions, is omitted, that definition becomes garbled since the corresponding definition in the Japanese environment is inherited. For preventing garbling, the category must be defined.

Command information file 203 is information associating between a resource name (command name: functional element identification name) and a resource ID (command ID: functional element ID), and is functional element definition information generated by associating a resource name with its unique resource ID. Such command information file 203 is generated by execute a resource definition information generation program 301, which will be described later, in the process of creating the application program 201, for example.

Although resource names (command names) defined in BP-DEFs described above are treated as strings, each resource (command) is managed using a resource ID (command ID) that is a numerical value in the MFC. The command information file 203 associates between resource names and resource IDs. In addition, upon executing replacement of characters in a command name, the replacement is specified for the original command string, association with a string of a command name before replacement is also required.

The command information file 203 is adapted to make their association, and is generated by loading code files (header files) and resource files for each project, and organizing the information into a file. In this embodiment, the command information file 203 has a file name "CommandInfo.txt" Hereinafter, the command information file 203 may be referred to as a CommandInfo.txt.

The application program 201 can obtain the command ID and the command string (related information) corresponding to a command name by looking up a CommandInfo.txt.

Note that a CommandInfo.txt is recorded in an installer of the application program 201 (a computer-readable recording medium having a program recorded thereon), together with the load module 201a of the application program 201 and BP-DEFs, to be provided to a user.

Specifically, the CommandInfo.txt is generated by extracting command names and automatically-generated command IDs (resource IDs, ID numbers, resource numbers) from code files (resource.h) for each project, extracting command strings corresponding to the command names from resource files, and associating therebetween.

Figure 34:
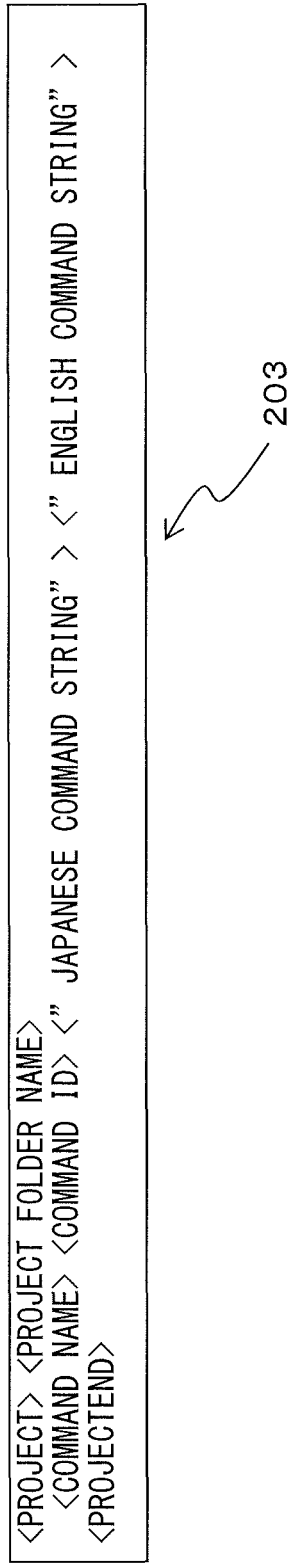
FIG. 34 is a diagram illustrating an example of a definition format for a CommandInfo.txt as one example of an embodiment.

FIG. 34 is a diagram illustrating an example of a definition format for a CommandInfo.txt as one example of an embodiment; and FIG. 35 is a diagram illustrating an example of the definition thereof.

A CommandInfo.txt is generated by associating a resource name (command name) with a resource ID (command ID) and a command string (related information) indicating the description of that command, as depicted in FIG. 34. Note that, in the example depicted in FIGS. 34 and 35, as examples of description of related information in various languages, command strings described in Japanese and English are depicted.

In addition, these definitions are defined for each project between a tag <PROJECT> and a tag <PROJECTEND> for that project. Note that a folder name of the project is to be specified in capital letters, and all of resource names in the format of "ID_xxx" collected from code files (resource.h) are to be defined.

Note that command IDs should not be defined, for those both Japanese and English command strings cannot be obtained.

In addition, a command string is to be defined by enclosing in double quotations ("). Furthermore, a null string ("") is to be defined in a case in which no command string cannot be obtained from resource files (***.rc).

In the example depicted in FIG. 35, for the project "MeBP", the commands ID_VIEW_ZOOM_ALL, ID_VIEW_ZOOM_IN, ID_VIEW_ZOOM_OUT, and ID_OVERWRITE_CONSTCSV are defined. For example, the command ID of the command ID_VIEW_ZOOM_ALL is 32830, which is to be displayed in "Zentai hyoji (&A)" in Japanese while being displayed in "Zoom full (&A)" in English.

Also in the example depicted in FIG. 35, for the project "EDITATTR", commands ID_SELECT_ITEM, ID_READ_FROM_CSV, ID_SAVE_TO_CSV_OVERWRITE, and ID_SELECT_CHILDPART are defined.

Furthermore, not only resources generated by programmers and contained in the application program 201, but also resource names and resource IDs of resources managed in systems, such as the OS, are registered in a CommandInfo.txt.

Figure 37:
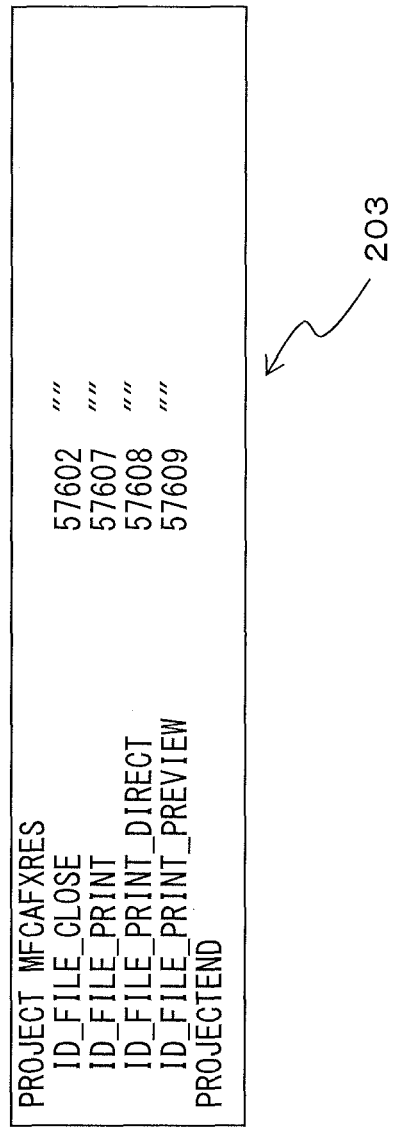
FIG. 37 is a diagram illustrating an example of the definition of an MFC-standard command obtained upon generation of a CommandInfo.txt as one example of an embodiment.

FIG. 36 is a diagram illustrating an example of the definition of an MFC-standard command obtained upon generation of a CommandInfo.txt as one example of an embodiment; and FIG. 37 is a diagram illustrating an example of the definition thereof.

The commands depicted in FIG. 36 are MFC-standard commands that can be executed as command for a printed board CAD, and are not defined in code files (resource.h). The command names depicted in FIG. 36 are defined in a file AFXRES.H in the Microsoft Visual Studio, for example. AFXRES.H is stored in the following file path, for example:
Program Files¥Microsoft Visual Studio¥VC98¥MFC¥Include¥AFXRES.H Any command names obtained from AFXRES.H are output to a CommandInfo.txt under the project name "MFCAFXRES", for example. If a command name specified in the project "MEBP" specified by a BP-DEF is not found in the "MEBP" project, the project "MFCAFXRES" is also made referenced to.

In the example depicted in FIG. 37, for the project "MFCAFXRES", commands ID_FILE_CLOSE, ID_FILE_PRINT, ID_FILE_PRINT_DIRECT, and ID_FILE_PRINT_PREVIEW are register in the CommandInfo.txt.

Here, a technique for generating a CommandInfo.txt will be described with reference to FIG. 38, following the a flowchart depicted in FIG. 39 (Steps A10-A50). Here, FIG. 38 is a diagram exemplifying a data flow in the process of generation of a CommandInfo.txt as one example of an embodiment.

The following processing will be performed by executing a resource definition information generation program 301 (see FIG. 38) by a CPU in a computer (not illustrated) having a programming function for generating the application program 201, for example. In addition, CommandInfo.txt is created after source code files and resource files of the application program 201 are completed, for example. The resource definition information generation program 301 is preferably executed when building code files. The automatic execution for every build can maintain the program up-to-date, and prevent omission of execution of the program.

Figure 38:
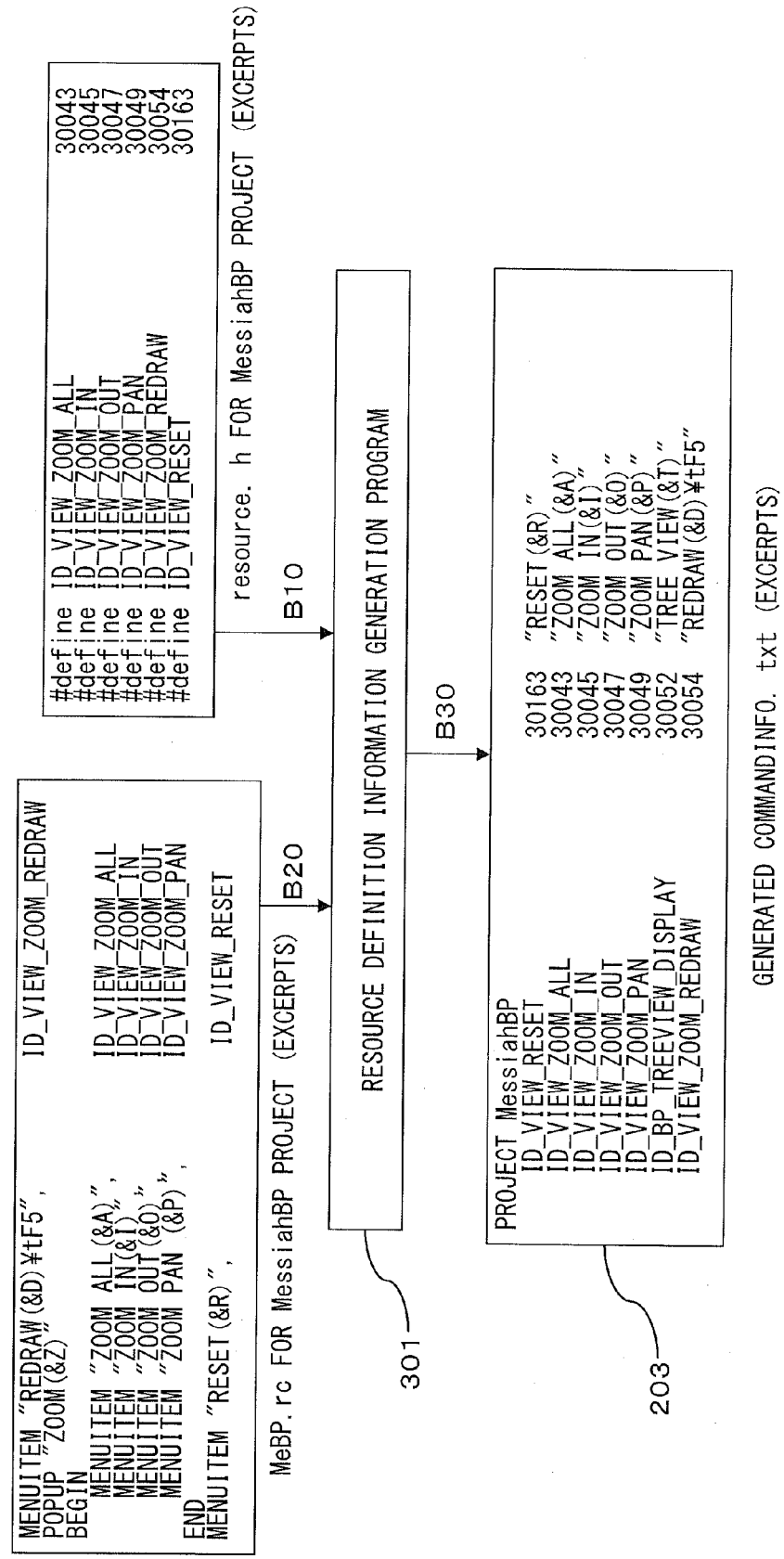
FIG. 38 is a diagram exemplifying a data flow in the process of generation of a CommandInfo.txt as one example of an embodiment.
Figure 39:
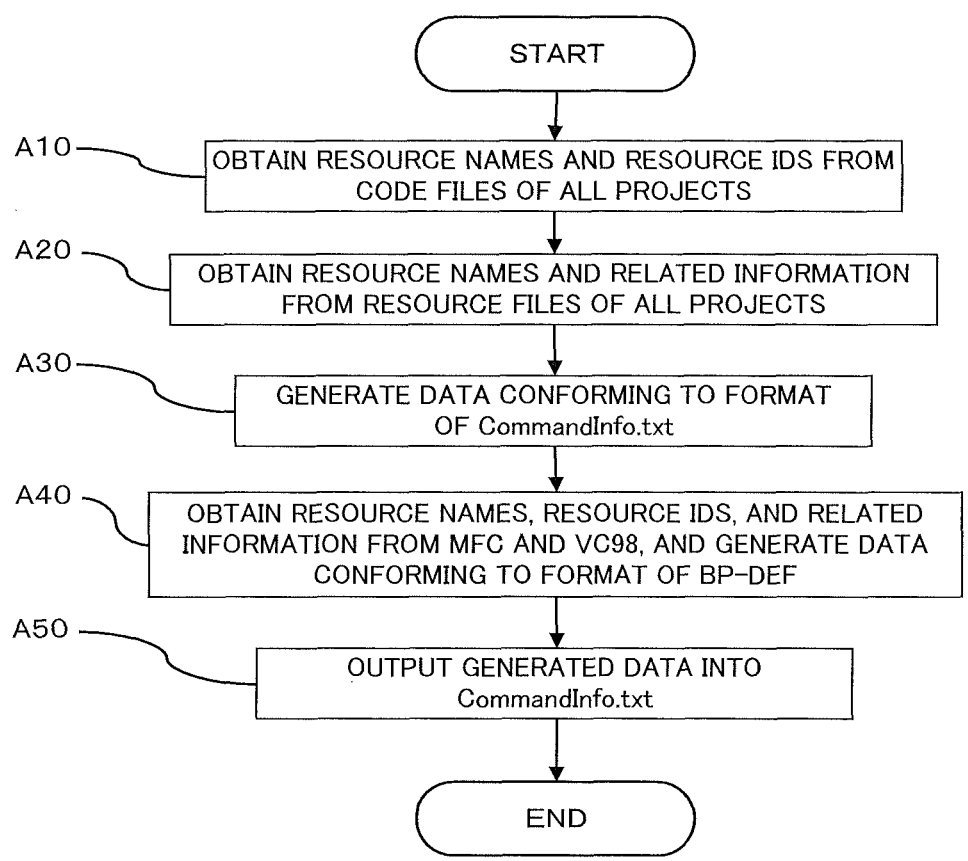
FIG. 39 is a flowchart illustrating a technique for generating a CommandInfo.txt as one example of an embodiment.

The CPU obtains resource names and resource IDs from code files (header files) of all projects of the application program 201, as indicated by Arrow B10 in FIG. 38 (Step A10; first obtaining step). Note that the code files are files generated to have the extension ".h", for example.

The CPU also obtains resource names and their related information from resource files of all projects the application program 201, as indicated by Arrow B20 in FIG. 38 (Step A20; second obtaining step). Note that the resource files are files generated to have the extension ".rc", for example. In addition, the related information related to the resource names are desirably provided according to the language types.

The CPU then generates data conforming to the format of CommandInfo.txt from the information obtained in Steps A10 and A20 (Step A30). In other words, a resource ID and related information are interrelated using a resource name as a key.

The CPU similarly obtains commands ID, command names, related information from AFXRES.RC and AFXRES.h of the MFC and WINUSER.h of the VC98 in Window, for example, and generates data in the format conforming to the format of a BP-DEF (Step A40).

Thereafter, the CPU generates a CommandInfo.txt 203 by merging the data generated in Steps A30 and A40, as indicated by Arrow B30 in FIG. 38, and outputting the merged data into a CommandInfo.txt (Step A50).

The CPU 10 is a processing apparatus that can perform various types of calculations and controls, and embodies various function by executing the OS and a program (the application program 201) stored in a storage device 21 or a ROM 24.

In this embodiment, the CPU 10 functions as a setup unit 11, a functional element definition information reading unit 15, and a control definition information reading unit 16 by executing the application program 201.

The control definition information reading unit 16 reads a resource definition file 202 stored the storage device 21, and obtains resource names from the resource definition file 202.

The functional element definition information reading unit 15 obtains resource IDs and related information corresponding to the resource names obtained by the control definition information reading unit 16, by making a reference to a command information file 203 stored in the storage device 21.

Using resource IDs obtained by the functional element definition information reading unit 15, the setup unit 11 sets up the application program 201 in the information processing apparatus 1 in accordance with the control information for the application program defined in the resource definition file 202.

More specifically, the setup unit 11 functions as a command control unit 12, a menu control unit 13, and a message control unit 14.

The menu control unit 13 is adapted to control menu screens to be displayed on the display device 25. By using the resource IDs obtained by the functional element definition information reading unit 15, the menu control unit 13 controls display of menus related to resources in menu screens, in accordance with control information that is defined in the resource definition file 202 and that specifies functions of the application program 201 executed on the information processing apparatus 1. In this manner, the menu control unit 13 restricts execution of functional elements in the information processing apparatus 1.

For example, the menu control unit 13 displays a menu of a command, usage of which is prohibited, in a display screen, in accordance with a use prohibited command definition section a4, or displays it in a specified language, in accordance with a language information definition section a2.

The menu control unit 13 replaces strings on a menu in accordance with a command character replacement definition section a5 and/or a screen character replacement definition section a6. The menu control unit 13 also performs view controls on tool bars or display windows in accordance with a user-specific environmental setting definition section a10.

The command control unit 12 is adapted to control commands that can be used (executed) in the information processing apparatus 1. Using command IDs obtained by the functional element definition information reading unit 15, the command control unit 12 restricts execution of commands in the information processing apparatus 1.

For example, the command control unit 12 prevents commands, usage of which is prohibited, from being started in the information processing apparatus 1, while allowing execution of commands, usage of which is allowed, in accordance with a use command definition section a3, a use prohibited command definition section a4, a prohibited command release definition section a9, a user-specific environmental setting definition section a10, and a license control definition section a11.

The message control unit 14 is adapted to messages to be displayed on the display device 25. The message control unit 14 replaces a string in a message, in accordance with a definition defined in the resource definition file 202, for example, for replacing at least a part of a string to be output to the display device 25 of the information processing apparatus 1 with another string.

For example, the message control unit 14 controls replacement of at least a part of a message to be displayed on the display device 25 to generate the message for display, in accordance with a screen character replacement definition section a6 and/or a delimited message character replacement definition section a8.

The CPU 10 in the information processing apparatus functions as the setup unit 11, the functional element definition information reading unit 15, and the control definition information reading unit 16 described above, by executing processing programs.

Note that programs (file processing programs) for implementing the functions as the setup unit 11, the functional element definition information reading unit 15, and the control definition information reading unit 16 are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW), a magnetic disk, an optical disk, a magneto-optical disk, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, a semiconductor storage device, or the like, and the program may be provided from to the storage device to the computer through a communication path.

Upon embodying the functions as the setup unit 11, the functional element definition information reading unit 15, and the control definition information reading unit 16, programs stored in an internal storage device (the RAM 23 and the ROM 24 in this embodiment) is executed by a microprocessor (the CPU 10 in this embodiment) of the computer. In this case, the computer may alternatively read a program stored in the storage medium for executing it.

Note that, in this embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the information processing apparatus 1 includes a function as a computer.

Figure 40:
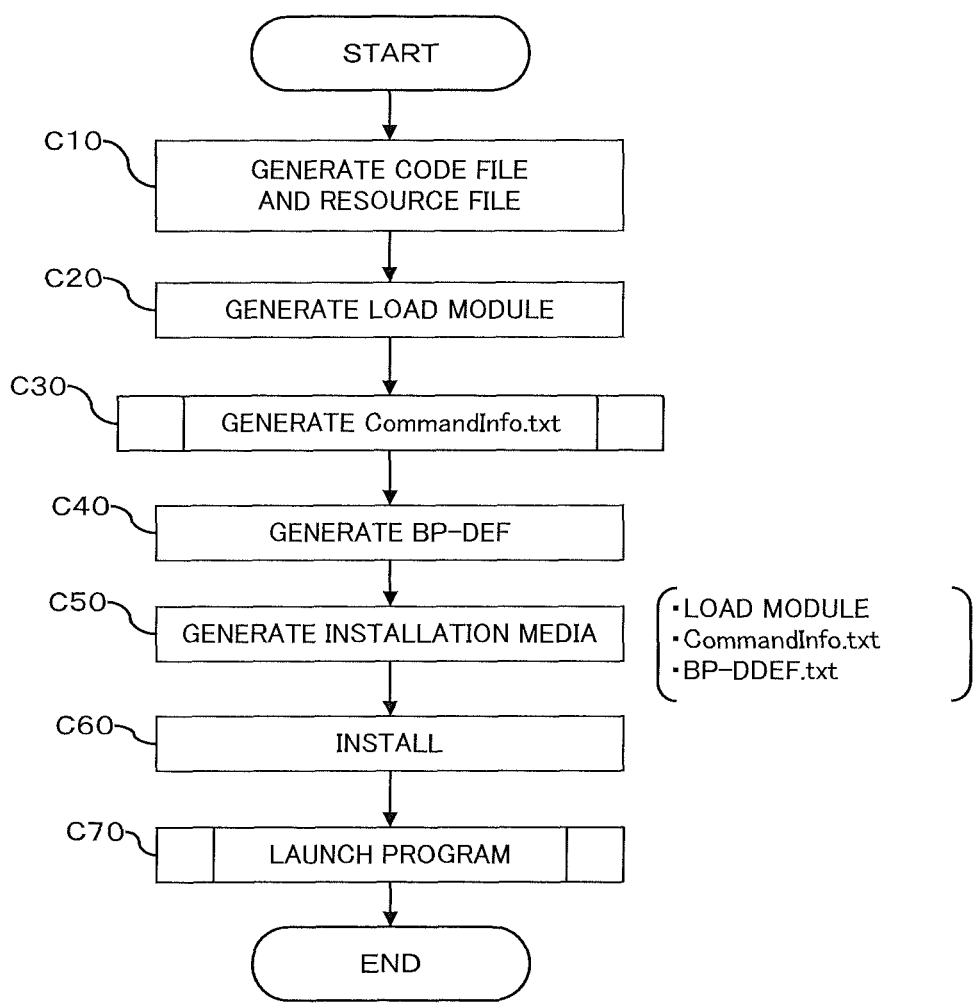
FIG. 40 is a flowchart illustrating a technique for generation processing of an application program as one example of an embodiment.

Here, the processing for generating an application program 201 will be described with reference to the flowchart depicted in FIG. 40 (Steps C10-C70).

A programmer creates code files and resource files for the application program 201, using a computer having a programming function (Step C10). The programmer then builds these code files and resource files using a build tool provided in the computer to create a load module 201a (Step C20).

The programmer creates a CommandInfo.txt based on the code files and the resource files created in Step C10, by executing the resource definition information generation program 301 on the computer (Step C30).

Furthermore, the programmer creates a BP-DEF in accordance with the purpose of the application program 201, the license owned by a user, or the like, using the computer (Step C40).

The programmer then creates an installation media by storing the load module 201a created in Step C20, the CommandInfo.txt created in Step C30, and the BP-DEF created in Step C40 into a recording medium (Step C50).

The created installation media is used to install the application program 201 into an information processing apparatus 1 used by the user (Step C60). After the installation is completed, startup processing of the application program 201 is carried out on the information processing apparatus 1 (Step C70).

Figure 41:
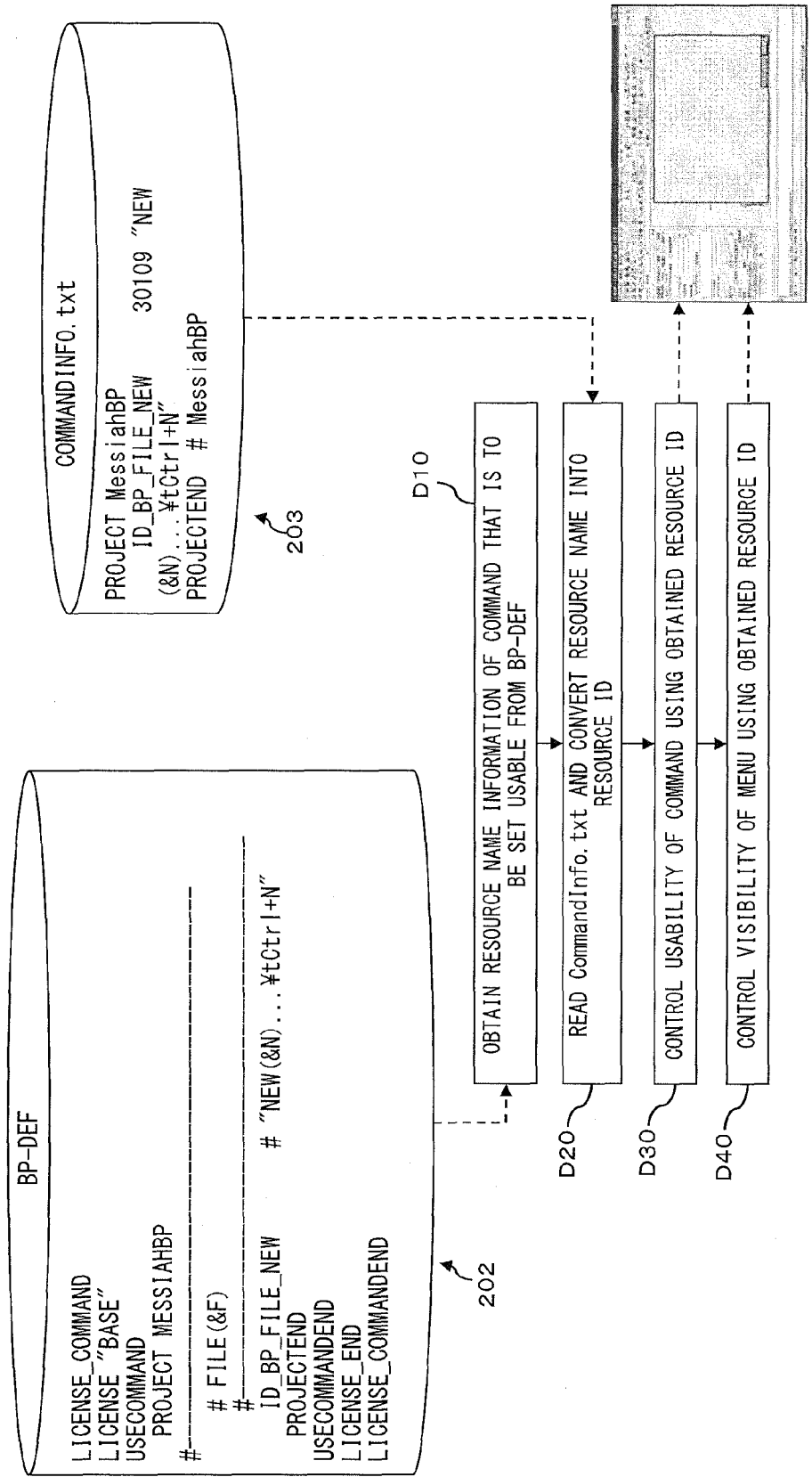
FIG. 41 is a flowchart illustrating processing in an information processing apparatus as one example of an embodiment.

Processing on an information processing apparatus 1 as one example of an embodiment configured as described above will be described with reference to the flowchart depicted in FIG. 41 (Steps D10-D40)

The processing is carried out when menus are switched on the information processing apparatus 1 in response to a user operation, upon startup of the application program 201, or during execution of the application program 201, for example.

A control definition information reading unit 16 obtains, from a BP-DEF 202, resource name information of a command to be set to usable (Step D10). In addition, a functional element definition information reading unit 15 loads a CommandInfo.txt 203 to convert the resource name obtained in Step D10 to a resource ID (Step D20). A setup unit 11 performs various types of controls using the resource ID obtained in Step D20.

In other words, a command control unit 12 controls the command to be usable or unusable (Step D30), and a menu control unit 13 performs a view control on a menu related to that command on a menu screen displayed on a display device 25 (Step D40). The message control unit 14 also performs a view control on a message related to that command on a display screen to be displayed on the display device 25.

As described below, in accordance with an information processing apparatus 1 as one example of an embodiment, controls for resources are defined, in accordance with the purpose or the like, in a BP-DEF that is created as an external file of an application program 201. Thereby, there is no need to create multiple resource files and code files for the respective purposes or the like, thereby reducing the management cost therefor.

In addition, control information for the application program 201 can be defined in a BP-DEF using resource names that can be arbitrarily set to resource, which is convenient.

Furthermore, controls for resources can be defined, even after installing the application program 201 on the information processing apparatus 1, by modifying a BP-DEF. Hence, view controls or function controls for the application program 201 can be flexibly modified. In addition, strings used for displaying screens and the like can be easily replaced, which is convenient.

Furthermore, a CommandInfo.txt can be automatically generated using a resource definition information generation program 301, which is convenient.

Furthermore, since a BP-DEF for customize is used in addition to a default BP-DEF, it is possible to provide the application program 201 with greater flexibility.

Furthermore, texts on menus or messages can be easily modified by defining character replacement definitions in the BP-DEF.

In conventional approaches, if a resource name of a command to be controlled is finalized during programming, that command can be deleted by specifying that resource name, for example.

Figure 46:
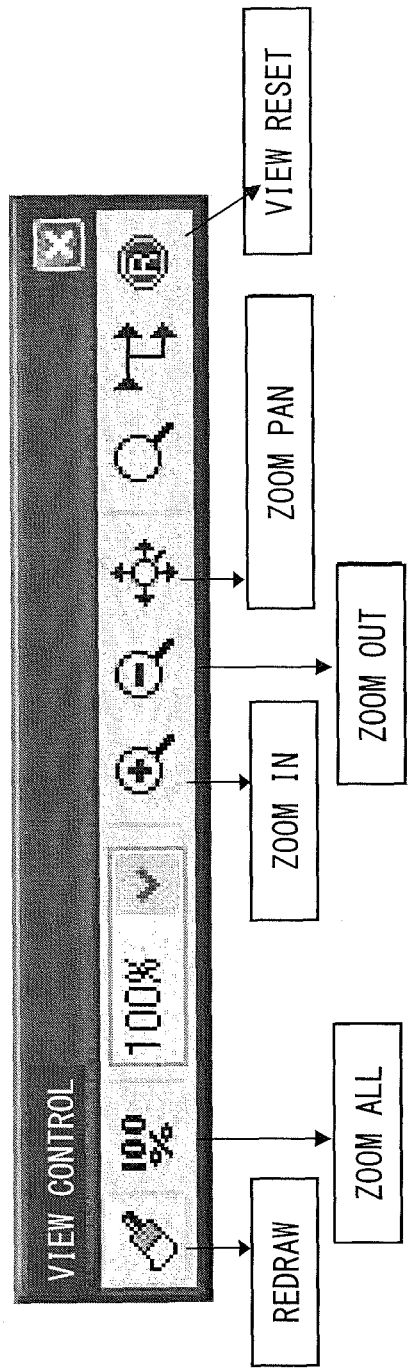
FIG. 46 is a diagram illustrating an example of a menu screen.

For example, any desired command can be deleted from a menu screen as depicted in FIG. 46, by entering the following command (P1) into a computer having a programming function.

menu->DeleteMenu(ID_VIEW_ZOOM_ALL,
       MF_BYPOSITION);                   (P1)

However, after the application program 201 has been started, each command is controlled using its resource ID on the information processing apparatus 1. Accordingly, dynamic control of a menu screen must be made by specifying the resource ID of the menu, as in the following command (P2):

menu->DeleteMenu(30043, MF_BYPOSITION);     (P2)

As described above, in the conventional approaches, a user, such as a programmer, must specify incomprehensive resource IDs, which is inconvenient and unrealistic.

On the other hand, in an information processing apparatus 1 disclosed herein, a user, such as a programmer, can controls to limit screen displays and functions, without the need to specify incomprehensive resource IDs.

Figure 43:
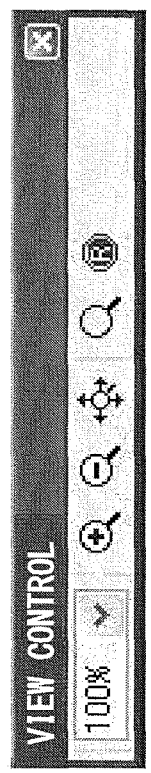
FIG. 43 is a diagram illustrating an example of a menu screen displayed on a display device as one example of an embodiment.

FIG. 42 is a diagram illustrating an example of the definition in a BP-DEF as one example of an embodiment; and FIG. 43 is a diagram illustrating an example of a menu screen displayed on a display device 25. Note that the menu screen depicted in FIG. 42 is a menu screen for view control, and icons of commands are placed.

As depicted in FIG. 42, definition of the line of the command (ID_VIEW_ZOOM_ALL), usage of which is to be prohibited, in a BP-DEF, by adding "#" in the beginning of that line, which makes the line undefined and thus prevent this command from being used.

In the CommandInfo.txt, the following line is defined:
ID_VIEW_ZOOM_ALL 30043 "Zoom all (&A)"
Based on the information, the menu control unit 13 performs view control not to show the corresponding commands (Redraw and Zoom all) on a menu screen as depicted in FIG. 43.

Note that the command "ID_VIEW_ZOOM_REDRAW" is also prohibited in the example depicted in FIG. 42.

The disclosed technique is not limited to the embodiment described above, and various modifications may be made without departing from the spirit of the present embodiments.

For example, the format to define a resource definition file 203 (BP-DEF) is not limited to the one depicted in FIG. 4, and may be suitably modified. For example, a BP-DEF may include definitions other than those exemplified in FIG. 4, or some of the definitions in FIG. 4 may be omitted.

In addition, tags used for various definitions in a BP-DEF are not limited to those used in the above-described embodiment, and may be suitably modified.

Furthermore, although the embodiment set forth above has been described with reference to the example in which an application program 201 is a CAD program and two types of CADs, namely, a printed board CAD and an infra CAD, can be selectively switched, this is not limiting. For example, the application program 201 may be used for intended purposes other than a printed board CAD or an infra CAD, and the application program 201 may be any programs other than a CAD program.

In addition, although the strings "![" and "]!" are used as delimiters in the embodiment set forth above, this is not limiting and various other delimiters may be used. It is desirable that a combination of two or more characters is used as a delimiter. It is particularly desirable to use a string with a lower incidence of that combination of characters in a general text.

The embodiment may be practiced or manufactured by those ordinally skilled in the art with reference to the above disclosure.

The disclosed technique may provide at least one of the following advantageous effects or advantages:
(1) There is no need to create multiple resource files and code files for the respective purposes or the like, thereby reducing the management cost therefor.
(2) Control information for application program can be defined using a functional element identification name that can be arbitrarily set to a functional element, which is convenient.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus being capable of executing an application program including multiple types of functional elements, the information processing apparatus comprising:
a control definition information storage unit that stores control definition information having control information related to the application program defined using a functional element identification name that can be arbitrarily set to a functional element;
a functional element definition information storage unit that stores functional element definition information related to a functional element ID unique to the functional element identification name;
at least one memory storing instructions; and
at least one processor executing the instructions to thereby operate as:
a control definition information reading unit that obtains the functional element identification name from the control definition information stored in control definition information storage unit;
a functional element definition information reading unit that obtains the functional element ID corresponding to the functional element identification name obtained by the control definition information reading unit, by making reference to the functional element definition information stored in the functional element definition information storage unit; and
a setup unit that sets up the application program in the information processing apparatus in accordance with control information related to the application program defined in the control definition information, using the functional element ID obtained by the functional element definition information reading unit.

2. The information processing apparatus according to claim 1, wherein the control definition information includes control information that specifies functions of the application program to be executed on the information processing apparatus as a control regarding usage of the functional element, and
the setup unit restricts execution of the functional element in the information processing apparatus using the functional element ID obtained by the functional element definition information reading unit.

3. The information processing apparatus according to claim 1, wherein the control definition information includes a definition for replacing a character related to the functional element as a control regarding usage of the functional element, and
the setup unit replaces a string related to the functional element using the functional element ID obtained by the functional element definition information reading unit.

4. The information processing apparatus according to claim 1, wherein the control definition information includes a definition for replacing at least a part of a string to be output to a display device of the information processing apparatus with another string, as a control regarding usage of the functional element, and the setup unit replaces the string based on the control definition information.

5. The information processing apparatus according to claim 1, wherein the control definition information includes a definition for identifying a language environmental setting in the information processing apparatus, as a control regarding usage of the functional element, the definition for identifying the language environmental setting having an operating environment for a particular language as a main setting, and defining a part that is modified from the main setting only for a different language, and
the setup unit sets up a function restricting setting for the application program using the main setting for an unmodified part.

6. The information processing apparatus according to claim 1, wherein the control definition information comprises
a control definition section related to usage of the functional element using a functional element identification name that is arbitrary set to the functional element; and
a control definition section related to usage of the functional element using a functional element identification name that is predefined based on a specification of an operating system (OS) of the information processing apparatus.

7. A method of processing an application program including multiple types of functional elements in an information processing apparatus, the method comprising:
a control definition information obtaining that , by a computer, obtains, for the application program, using a functional element identification name that is arbitrary set to a functional element, the functional element identification name from control definition information for which control information related to the application program is defined;
a functional element definition information obtaining that , by a computer, obtains, by referencing to functional element definition information configured related to a functional element ID unique to the functional element identification name, the functional element ID corresponding to the functional element identification name obtained at the control definition information obtaining; and
a setup that, by a computer, sets up the application program in the information processing apparatus in accordance with control information related to the application program defined in the control definition information, using the functional element ID obtained at the functional element definition information obtaining.

8. The processing method according to claim 7, wherein the control definition information includes control information that specifies functions of the application program to be executed on the information processing apparatus as a control regarding usage of the functional element, and
the setup restricts execution of the functional element in the information processing apparatus using the functional element ID obtained at the functional element definition information obtaining.

9. The processing method according to claim 7, wherein the control definition information includes a definition for replacing a character related to the functional element as a control regarding usage of the functional element, and
the setup replaces a string related to the functional element using the functional element ID obtained at functional element definition information obtaining.

10. The processing method according to claim 7, wherein the control definition information includes a definition for replacing at least a part of a string to be output to a display device of the information processing apparatus with another string, as a control regarding usage of the functional element, and
the setup replaces the string based on the control definition information.

11. The processing method according to claim 7, wherein the control definition information includes a definition for identifying a language environmental setting in the information processing apparatus, as a control regarding usage of the functional element, the definition for identifying the language environmental setting having an operating environment for a particular language as a main setting, and defining a part that is modified from the main setting only for a different language, and
the setup sets up a function restricting setting for the application program using the main setting for an unmodified part.

12. The processing method according to claim 7, wherein the control definition information comprises:
a control definition section related to usage of the functional element using a functional element identification name that is arbitrary set to the functional element; and
a control definition section related to usage of the functional element using a functional element identification name that is predefined based on an operating system (OS) of the information processing apparatus.

13. A non-transitory computer-readable recording medium having a processing program stored thereon, the processing program making a computer to process an application program including multiple types of functional elements, the processing program makes the computer to execute:
a control definition information obtaining that obtains, for the application program, using a functional element identification name that is arbitrary set to a functional element, the functional element identification name from control definition information for which control information related to the application program is defined;
a functional element definition information obtaining that obtains, by referencing to functional element definition information configured related to a functional element ID unique to the functional element identification name, the functional element ID corresponding to the functional element identification name obtained at the control definition information obtaining; and
a setup that sets up the application program in the information processing apparatus in accordance with control information related to the application program defined in the control definition information, using the functional element ID obtained at the functional element definition information obtaining.

14. A non-transitory computer-readable recording medium having a processing program recorded thereon according to claim 13, wherein the control definition information includes control information that specifies functions of the application program to be executed on the information processing apparatus as a control regarding usage of the functional element, and
the program makes the computer to function such that the setup restricts execution of the functional element in the information processing apparatus using the functional element ID obtained at the functional element definition information obtaining.

15. A non-transitory computer-readable recording medium having a processing program recorded thereon according to claim 13, wherein the control definition information includes a definition for replacing a character related to the functional element as a control regarding usage of the functional element, and the program makes the computer to function such that the setup replaces a string related to the functional element using the functional element ID obtained at functional element definition information obtaining.

16. A non-transitory computer-readable recording medium having a processing program recorded thereon according to claim 13, wherein the control definition information includes a definition for replacing at least a part of a string to be output to a display device of the information processing apparatus with another string, as a control regarding usage of the functional element, and the program makes the computer to function such that the setup replaces the string based on the control definition information.

17. A non-transitory computer-readable recording medium having a processing program recorded thereon according to claim 13, wherein the control definition information includes a definition for identifying a language environmental setting in the information processing apparatus, as a control regarding usage of the functional element, the definition for identifying the language environmental setting element having an operating environment for a particular language as a main setting, and only defining a part that is modified from the main setting only for a different language, and the program makes the computer to function such that the setup sets up a function restricting setting for the application program using the main setting for an unmodified part.

18. A non-transitory computer-readable recording medium having a processing program recorded thereon according to claim 13, wherein the control definition information and the functional element management information are recorded together with the processing program.

19. A method of generating functional element definition information that generates functional element definition information used for startup processing of in an information processing apparatus, an application program including multiple types of functional elements, the method comprising:

a first obtaining that, by a computer, obtains a functional element identification name set for the functional element and a functional element ID uniquely set for the functional element identification name from a code file of the application program;

a second obtaining that, by a computer, obtains the functional element identification name and related information registered associated with the functional element identification name from a resource file of the application program; and generating, by a computer, the functional element definition information by combining the functional element identification name and the functional element ID obtained at the first obtaining and the functional element identification name and the related information obtained at the second obtaining based on the functional element identification name.

* * * * *